US012695838B2

(12) United States Patent
    Tanaka

(10) Patent No.: US 12,695,838 B2
(45) Date of Patent: Jul. 28, 2026

(54) IMAGE READING APPARATUS AND IMAGE FORMING APPARATUS

(71) Applicant: CANON KABUSHIKI KAISHA, Tokyo (JP)

(72) Inventor: Shigeto Tanaka, Chiba (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 312 days.

(21) Appl. No.: 18/607,962

(22) Filed: Mar. 18, 2024

(65) Prior Publication Data

US 2024/0323289 A1      Sep. 26, 2024

(30) Foreign Application Priority Data

Mar. 22, 2023    (JP) ................................. 2023-045374

(51) Int. Cl.
    *H04N 1/00*        (2006.01)
    *H04N 1/60*        (2006.01)
(52) U.S. Cl.
    CPC ..... *H04N 1/00779* (2013.01); *H04N 1/00721* (2013.01); *H04N 1/6044* (2013.01)
(58) Field of Classification Search
    CPC ........... H04N 1/00779; H04N 1/00721; H04N 1/6044
    USPC ....................................................... 358/474
    See application file for complete search history.

(56) References Cited

U.S. PATENT DOCUMENTS

| | | | |
|---|---|---|---|
| 7,502,147 B2 | 3/2009 | Suzuki et al. | |
| 9,560,229 B2 * | 1/2017 | Maeda | H04N 1/00795 |
| 10,498,929 B2 * | 12/2019 | Tomii | G03G 15/5062 |
| 11,201,972 B2 | 12/2021 | Tomii | |
| 2011/0317175 A1 * | 12/2011 | Murayama | G06K 15/002 |
| | | | 358/1.2 |
| 2021/0185181 A1 * | 6/2021 | Tomii | G06F 3/1285 |
| 2022/0188584 A1 * | 6/2022 | Tomii | G03G 15/5062 |

FOREIGN PATENT DOCUMENTS

| | | |
|---|---|---|
| JP | 2016010127 A | 1/2016 |
| JP | 2021145377 A | 9/2021 |

* cited by examiner

*Primary Examiner* — Gabriel I Garcia
(74) *Attorney, Agent, or Firm* — ROSSI, KIMMS & McDOWELL LLP

(57)        ABSTRACT

An image reading apparatus includes a tray on which a sheet is to be placed, a conveyance unit configured to convey the sheet placed on the tray, a platen on which a sheet is to be placed, a reading unit configured to read one of a first surface of the sheet conveyed by the conveyance unit and a first surface of the sheet placed on the platen, and a controller configured to control the image reading apparatus to execute, a first reading mode of reading, by the reading unit, a first surface of a sheet having a plurality of test images formed thereon, which is conveyed by the conveyance unit; and a second reading mode of reading, by the reading unit, the first surface of the sheet having the plurality of test images formed thereon, which is placed on the platen.

15 Claims, 10 Drawing Sheets

MAIN SCANNING DIRECTION

SUB-SCANNING DIRECTION

MAIN SCANNING DIRECTION

SUB-SCANNING DIRECTION

1

IMAGE READING APPARATUS AND IMAGE FORMING APPARATUS

BACKGROUND OF THE INVENTION

Field of the Invention

The present disclosure relates to an image reading apparatus for reading an image printed on a sheet so as to detect a printing position of this image, and to an image forming apparatus including such an image reading apparatus.

Description of the Related Art

In some cases, a sheet having an image printed thereon by an image forming apparatus, such as a printer, a copying machine, or a multifunctional peripheral, is read by an image reading apparatus in order to adjust a geometric characteristic such as a printing position of the image. In those cases, a patch image for detecting the printing position is printed onto the sheet. The sheet having the patch image printed thereon is hereinafter referred to as "test chart". The image reading apparatus reads the patch image printed on the test chart so as to detect the printing position of the patch image from a reading result of the patch image. The image reading apparatus derives a correction value for adjusting the printing position based on a difference between the detected printing position and an ideal printing position. The image forming apparatus adjusts the printing position of the image to be printed onto the sheet, based on this correction value. In a case where the image forming apparatus performs duplex printing, printing positions of images on respective front and back surfaces are adjusted so that misregistration of the printing positions of the images to be printed on the front and back surfaces can be corrected.

The image reading apparatus includes an automatic conveying device (hereinafter referred to as "auto document feeder (ADF)"). Thus, while a sheet is conveyed, this sheet can be read. With the ADF having an image reading function, the image reading apparatus can read the images printed on both surfaces of the sheet by one conveyance of the sheet. In Japanese Patent Application Laid-open No. 2021-145377, an image reading apparatus including such an ADF is disclosed. This image reading apparatus conveys the test chart having the patch images printed on both surfaces thereof by the ADF once so that the patch images on both the surfaces can be read. The patch images on both the surfaces can be read by one conveyance, and hence convenience of a user is improved.

The image reading apparatus including the ADF generally performs, with a direction orthogonal to a conveying direction of a sheet being regarded as a main scanning direction, reading processing by each line in the main scanning direction, in synchronization with a main-scanning synchronization signal generated at a certain timing. In this case, the conveying direction of the sheet is a sub-scanning direction. In a case where the sheet is read while the sheet is conveyed, a length of each of the sheet and the image in the conveying direction, which is obtained from the reading result (read image), is different from an actual length of each of the sheet and the image in the conveying direction. This difference hinders accurate detection of the geometric characteristic of the image, such as misregistration of the printing position of the image or misregistration of the printing positions on the front and back surfaces.

In order to correct a difference (sub-scanning magnification) in the conveying direction (sub-scanning direction) between the length of each of the sheet and the image obtained from the reading result and the actual length of each of the sheet and the image, a sub-scanning magnification correction value is set in the image reading apparatus. The sub-scanning magnification is corrected through use of the sub-scanning magnification correction value so that the geometric characteristic can be accurately detected.

In some cases, in the ADF, a conveyance load may change due to a difference in basis weight of the sheet, or a conveyance efficiency may change due to a difference in surface property of the sheet. Accordingly, even in a case where the ADF controls the sheet to be conveyed at a certain speed, a variation in conveying speed is caused depending on the type of the sheet. The variation in conveying speed caused depending on the type of the sheet becomes a variation in sub-scanning magnification of each type of sheet. The image reading apparatus stores in advance the sub-scanning magnification correction value in each apparatus. However, the sub-scanning magnification changes depending on the type of the sheet, and hence it is difficult to effectively correct the sub-scanning magnification by the same sub-scanning magnification correction value for all types of sheets. In a case where the sub-scanning magnification cannot be accurately corrected, the accuracy of correction of the geometric characteristic of the image to be printed is reduced.

SUMMARY OF THE INVENTION

An image reading apparatus according to one embodiment of the present disclosure includes a tray on which a sheet is to be placed, a conveyance unit configured to convey the sheet placed on the tray, a platen on which a sheet is to be placed, a reading unit configured to read one of a first surface of the sheet conveyed by the conveyance unit and a first surface of the sheet placed on the platen, and a controller configured to control the image reading apparatus to execute a first reading mode of reading, by the reading unit, a first surface of a sheet having a plurality of test images formed thereon, which is conveyed by the conveyance unit, and a second reading mode of reading, by the reading unit, the first surface of the sheet having the plurality of test images formed thereon, which is placed on the platen, wherein the controller is configured to obtain a correction value for correcting a reading operation of reading, by the reading unit, the sheet conveyed by the conveyance unit, based on a first read image read by the first reading mode and a second read image read by the second reading mode.

An image reading apparatus according to another embodiment of the present disclosure includes a tray on which a sheet is to be placed, a conveyance unit configured to convey the sheet placed on the tray, a platen on which a sheet is to be placed, a reading unit configured to read one of a first surface of the sheet conveyed by the conveyance unit and a first surface of the sheet placed on the platen, and a controller configured to control the image reading apparatus to execute a first reading mode of reading, by the reading unit, a first surface of a sheet having a plurality of test images formed thereon, which is conveyed by the conveyance unit, and a second reading mode of reading, by the reading unit, the first surface of the sheet having the plurality of test images formed thereon, which is placed on the platen, wherein the controller is configured to correct a conveying speed of the sheet conveyed by the conveyance unit, based on a first read image read by the first reading mode and a second read image read by the second reading mode, and control the reading unit to execute reading of a sheet conveyed at the corrected conveying speed.

An image forming apparatus according to yet another embodiment of the present disclosure includes a printer engine configured to form an image onto a sheet based on a predetermined image forming condition a tray on which the sheet having the image formed thereon by the printer engine is to be placed a conveyance unit configured to convey the sheet placed on the tray a platen on which the sheet having the image formed thereon by the printer engine is to be placed a reading unit configured to read one of a first surface of the sheet conveyed by the conveyance unit and a first surface of the sheet placed on the platen, and a controller configured to control the image forming apparatus to execute a first reading mode of reading, by the reading unit, a first surface of a sheet having a plurality of test images formed thereon, which is conveyed by the conveyance unit and a second reading mode of reading, by the reading unit, the first surface of the sheet having the plurality of test images formed thereon, which is placed on the platen, wherein the controller is configured to obtain a first correction value for correcting a reading operation of reading, by the reading unit, the sheet conveyed by the conveyance unit, based on a first read image read by the first reading mode and a second read image read by the second reading mode, and wherein the controller is configured to generate a second correction value for correcting the image forming condition, based on a read image obtained by reading, by the reading unit, the sheet conveyed by the conveyance unit after correction based on the first correction value has been performed.

Further features of the present invention will become apparent from the following description of exemplary embodiments (with reference to the attached drawings).

DESCRIPTION OF THE EMBODIMENTS

Now, referring to the accompanying drawings, description is given of exemplary embodiments of the present disclosure.

First Embodiment

Figure 1:
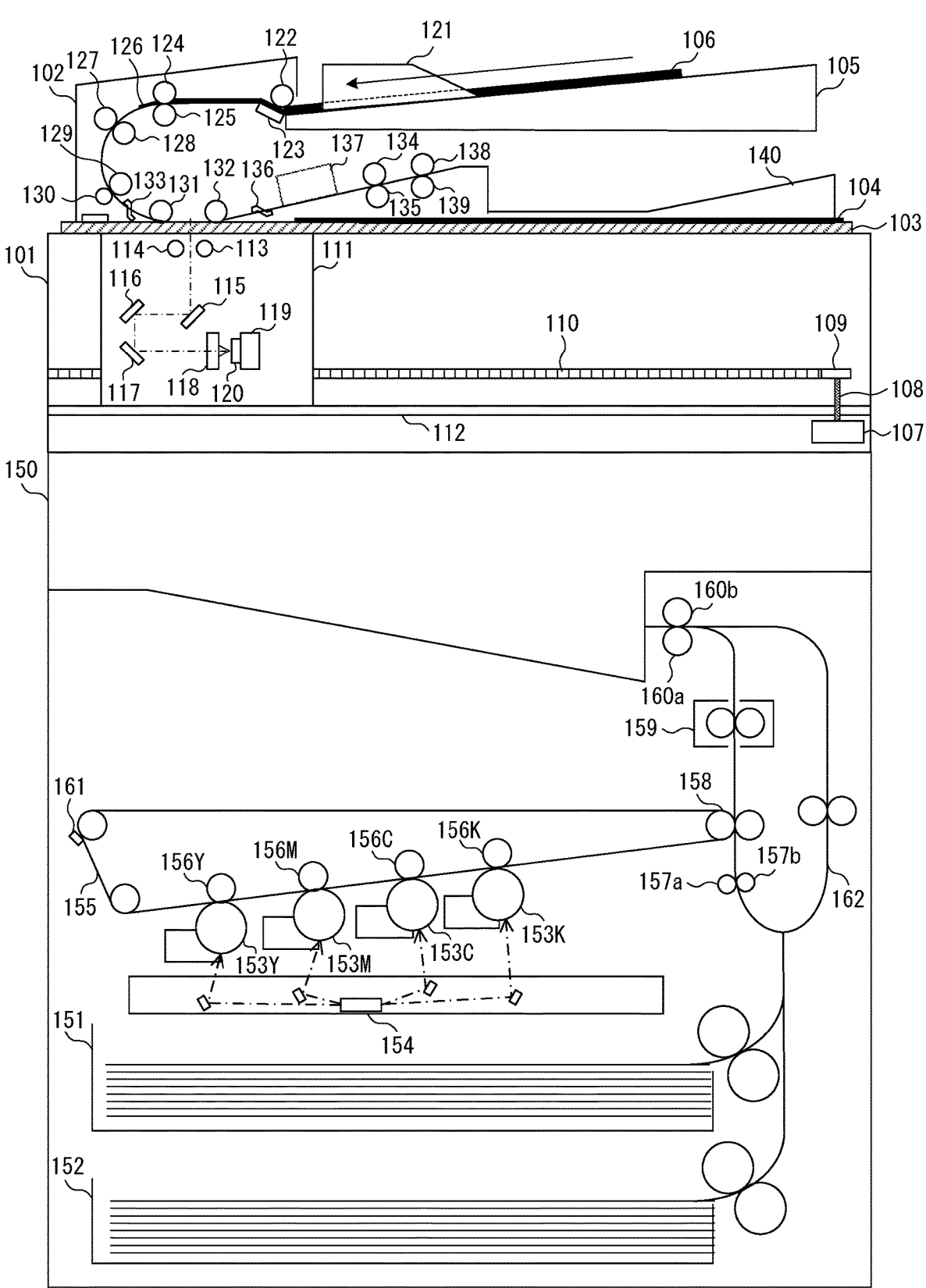
FIG. 1 is a configuration view of an image forming apparatus.

FIG. 1 is a configuration view of an image forming apparatus including an image reading apparatus according to a first embodiment of the present disclosure. An image reading apparatus 101 is arranged on an upper portion of an image forming apparatus 150. The image reading apparatus 101 includes, on its upper portion, an ADF 102 which is an automatic conveying device for a sheet. The image reading apparatus 101 includes a platen 103 on a side on which the ADF 102 is arranged. The image reading apparatus 101 reads a sheet having an image printed thereon through use of the platen 103 or the ADF 102. A reading mode of reading a sheet placed on the platen 103 is referred to as "platen reading mode." A reading mode of reading a sheet through use of the ADF 102 is referred to as "ADF reading mode."
<Image Reading Apparatus>

The image reading apparatus 101 includes therein an optical motor 107, a motor shaft 108, a gear 109, a belt 110, a first image reading unit 111, and a rail 112. The first image reading unit 111 includes light sources 113 and 114, reflecting mirrors 115, 116, and 117, an imaging lens 118, and an image reading sensor 120 mounted on an image reading substrate 119.

The optical motor 107 supplies a drive force to the gear 109 via the motor shaft 108. The gear 109 rotates by the drive force supplied from the optical motor 107. The belt 110 is connected to the gear 109, and the gear 109 rotates to move the belt 110 in a right-and-left direction of FIG. 1. The first image reading unit 111 is mounted to the belt 110. The first image reading unit 111 is arranged on the rail 112. The belt 110 moves in the right-and-left direction of FIG. 1 so that the first image reading unit 111 can move along the rail 112 in the right-and-left direction of FIG. 1.

In a case where the optical motor 107 rotates in a predetermined direction (clockwise direction in the first embodiment), the first image reading unit 111 moves from the left to the right of FIG. 1. In a case where the optical motor 107 rotates in a direction (counterclockwise direction in the first embodiment) opposite to the predetermined direction, the first image reading unit 111 moves from the right to the left of FIG. 1.

The first image reading unit 111 applies light to the sheet by the light sources 113 and 114. Reflected light of light applied to the sheet from the light sources 113 and 114 is reflected by the reflecting mirrors 115, 116, and 117 to be imaged by the imaging lens 118 onto a light receiving surface of the image reading sensor 120. The image reading sensor 120 inputs, to the image reading substrate 119, an electrical signal generated by photoelectrically converting the reflected light received by the light receiving surface. The image reading substrate 119 generates a read image as a reading result of the sheet, based on the electrical signal acquired from the image reading sensor 120. The first image reading unit 111 performs reading processing of reading the sheet as described above.

In the case of the platen reading mode, the first image reading unit 111 reads a sheet 104 placed on the platen 103, and hence the first image reading unit 111 performs the reading processing while moving from the left to the right of FIG. 1. The first image reading unit 111 reads the sheet 104 by each line in the main scanning direction, with the depth direction of FIG. 1 being regarded as the main scanning direction. The moving direction of the first image reading unit 111 is the sub-scanning direction.

In the case of the ADF reading mode, the first image reading unit 111 reads a sheet 126 conveyed by the ADF 102 without moving. The ADF 102 causes the sheet 126 to pass through a reading position of the first image reading unit 111 one by one. The first image reading unit 111 reads the sheet 126 passing through the reading position by each line in the main scanning direction. In the case of the ADF reading mode, the conveying direction of the sheet 126 is the sub-scanning direction.

The ADF 102 includes an original tray 105 on which a sheet bundle 106 obtained by bundling one or more sheets 126 is to be placed. The original tray 105 includes, in order to suppress skew feeding at the time of sheet conveyance, width regulating plates 121 for regulating the sheet bundle 106 in the main scanning direction orthogonal to the conveying direction of the sheet 126. The sheet bundle 106 is placed on the original tray 105 so that both ends in the main scanning direction thereof abut against the width regulating plates 121.

The ADF 102 discharges the sheet 126 fed one by one from the sheet bundle 106 placed on the original tray 105 to a sheet discharge tray 140 via the reading position of the first image reading unit 111. In order to feed the sheet 126 one by one from the sheet bundle 106, the ADF 102 includes a pickup roller 122, a separation pad 123, a sheet feeding roller 124, and a separation roller 125. The sheet picked up from the sheet bundle 106 by the pickup roller 122 and the separation pad 123 is conveyed to a nip portion between the sheet feeding roller 124 and the separation roller 125 which are arranged to be opposed to each other. The sheet feeding roller 124 and the separation roller 125 form a separation unit to separate and convey the uppermost sheet 126 of the sheet bundle 106 one by one.

The ADF 102 includes, on a conveyance path through which the sheet 126 is conveyed, a first conveyance roller pair 127 and 128, a registration roller pair 129 and 130, a second conveyance roller 131, a third conveyance roller 132, a fourth conveyance roller pair 134 and 135, and a discharge roller pair 138 and 139. A first read sensor 133 is provided between the registration roller pair 129 and 130 and the second conveyance roller 131. A second read sensor 136 and a second image reading unit 137 are provided between the third conveyance roller 132 and the fourth conveyance roller pair 134 and 135. The reading position of the first image reading unit 111 is provided between the second conveyance roller 131 and the third conveyance roller 132.

The one sheet 126 separated by the separation unit is conveyed to the registration roller pair 129 and 130 by the first conveyance roller pair 127 and 128. The registration roller pair 129 and 130 corrects the skew feeding of the sheet 126 and conveys the sheet 126 to the second conveyance roller 131. The second conveyance roller 131 conveys the sheet 126 to the reading position of the first image reading unit 111. The first read sensor 133 detects the sheet 126 to be conveyed to the second conveyance roller 131. The first image reading unit 111 starts the reading processing of reading the sheet 126 in response to the detection of the sheet 126 by the first read sensor 133. The first image reading unit 111 performs the reading processing during a period in which the sheet 126 passes through the reading position so that a read image of a first surface (front surface) of the sheet 126 is generated.

The third conveyance roller 132 conveys the sheet 126 that has passed through the reading position of the first image reading unit 111 to a reading position of the second image reading unit 137. The second read sensor 136 detects the sheet 126 to be conveyed to the reading position of the second image reading unit 137 by the third conveyance roller 132. The second image reading unit 137 starts the reading processing of reading the sheet 126 in response to the detection of the sheet 126 by the second read sensor 136. The second image reading unit 137 performs the reading processing during a period in which the sheet 126 passes through the reading position so that a read image of a second surface (back surface) different from the front surface of the sheet 126 is generated.

The second image reading unit 137 includes, similarly to the first image reading unit 111, light sources, reflecting mirrors, an imaging lens, an image reading substrate, and an image reading sensor. The reading processing performed by the second image reading unit 137 is similar to the reading processing performed by the first image reading unit 111.

The fourth conveyance roller pair 134 and 135 conveys the sheet 126 that has passed through the reading position of the second image reading unit 137 to the discharge roller pair 138 and 139. The discharge roller pair 138 and 139 discharges the sheet 126 that has been conveyed, to the sheet discharge tray 140.

<Image Forming Apparatus>

The image forming apparatus 150 includes a first sheet feeding cassette 151 and a second sheet feeding cassette 152 on each of which sheets are to be stacked. The image forming apparatus 150 forms an image on a sheet fed from any one of the first sheet feeding cassette 151 and the second sheet feeding cassette 152. On the conveyance path through which the sheet is conveyed, a registration roller pair 157a and 157b and a discharge roller pair 160a and 160b are provided. Further, on the conveyance path, a reverse path 162 is also provided. The image forming apparatus 150 includes photosensitive drums 153Y, 153M, 153C, and 153K, an exposing device 154, primary transfer rollers 156Y, 156M, 156C, and 156K, an intermediate transfer belt 155, a secondary transfer portion 158, and a fixing device 159.

The photosensitive drums 153Y, 153M, 153C, and 153K are drum-shaped photosensitive members each having a photosensitive layer on its surface. Each of the photosensitive drums 153Y, 153M, 153C, and 153K is rotated about a drum shaft and its surface is uniformly charged. The exposing device 154 applies laser light modified based on image data to the photosensitive drums 153Y, 153M, 153C, and 153K whose surfaces have been charged, to thereby form electrostatic latent images corresponding to the image data on the surfaces of the photosensitive drums 153Y, 153M, 153C, and 153K. The electrostatic latent images formed on the surfaces of the photosensitive drums 153Y, 153M, 153C, and 153K are developed by developers of corresponding colors.

In this manner, a yellow toner image is formed on the photosensitive drum 153Y. A magenta toner image is formed on the photosensitive drum 153M. A cyan toner image is formed on the photosensitive drum 153C. A black toner image is formed on the photosensitive drum 153K.

The toner images of the respective colors are transferred by the primary transfer rollers 156Y, 156M, 156C, and 156K onto the intermediate transfer belt 155 from the photosensitive drums 153Y, 153M, 153C, and 153K. The primary transfer rollers 156Y, 156M, 156C, and 156K are arranged at positions opposed to the corresponding photosensitive drums 153Y, 153M, 153C, and 153K across the intermediate transfer belt 155. A predetermined transfer bias voltage is applied to each of the primary transfer rollers 156Y, 156M, 156C, and 156K so that the toner image is transferred.

The intermediate transfer belt 155 is rotated in the counterclockwise direction of FIG. 1, and the toner images of the respective colors are transferred in a superimposing manner in order from the photosensitive drum 153Y. The primary transfer rollers 156Y, 156M, 156C, and 156K are arranged at predetermined intervals with respect to a surface of the intermediate transfer belt 155 on which the toner images are to be transferred, and transfer the toner images at timings corresponding to a rotating speed of the intermediate transfer belt 155. The intermediate transfer belt 155 rotates so as to convey the transferred toner images of the respective colors to the secondary transfer portion 158.

The sheet is fed to the registration roller pair 157*a* and 157*b* from any one of the first sheet feeding cassette 151 and the second sheet feeding cassette 152. The registration roller pair 157*a* and 157*b* corrects the skew feeding of the sheet. The registration roller pair 157*a* and 157*b* conveys the sheet to the secondary transfer portion 158 in synchronization with the timing at which the toner images borne on the intermediate transfer belt 155 are conveyed to the secondary transfer portion 158. A predetermined transfer bias voltage is applied to the secondary transfer portion 158 so that the toner images of the respective colors borne on the intermediate transfer belt 155 are collectively transferred onto the sheet. A belt cleaner 161 is arranged in the vicinity of the intermediate transfer belt 155. The belt cleaner 161 collects the toner remaining on the intermediate transfer belt 155 after the transfer.

The secondary transfer portion 158 conveys the sheet having the toner images transferred thereon to the fixing device 159. The fixing device 159 includes a plurality of rollers and a heater. The fixing device 159 applies heat and pressure to the images transferred onto the sheet to melt and fix the toner to the sheet. In this manner, a full-color image is printed on the sheet. The sheet having the image fixed thereto by the fixing device 159 is discharged from the image forming apparatus 150 by the discharge roller pair 160*a* and 160*b* as a delivered product.

In a case of a duplex printing mode of printing images on both surfaces of the sheet, the image forming apparatus 150 re-conveys the sheet having an image printed on its first surface (front surface) to the registration roller pair 157*a* and 157*b*. In this case, after the sheet having an image printed on its front surface is halfway discharged to the outside of the apparatus by the discharge roller pair 160*a* and 160*b*, the discharge roller pair 160*a* and 160*b* is reversely rotated so that the sheet is conveyed to the reverse path 162. In this manner, the surface on which the image is to be printed of the sheet is reversed from the front surface to a second surface (back surface) different from the front surface. An image is printed onto the back surface of the sheet by processing similar to that performed in a case where the image is printed onto the front surface, and the sheet is discharged to the outside of the apparatus. As described above, the delivered product having images printed on both surfaces of the sheet is obtained.

In a case where a printing instruction is given from the user by a print job, the image forming apparatus 150 prints an image onto a sheet based on image data representing an image instructed by the print job. In a case where the image forming apparatus 150 adjusts a geometric characteristic of the image, such as misregistration of the printing position of the image or misregistration of the printing positions of the images on the front and back surfaces at the time of duplex printing, the image forming apparatus 150 prints an adjusting image for adjusting the geometric characteristic onto the sheet. The sheet having the adjusting image printed thereon is read as a test chart by the image reading apparatus 101. The image forming apparatus 150 adjusts the geometric characteristic based on the reading result (read image) of the test chart. The adjustment of the geometric characteristic is performed by, for example, deriving a correction value for correcting the misregistration of the printing position or the misregistration of the printing positions on the front and back surfaces at the time of duplex printing from the reading result of the test chart, and adjusting an image forming condition through use of this correction value. Examples of the image forming condition include an exposure condition of the exposing device 154 in a case where the image forming apparatus 150 forms an image on the sheet, a condition at the time of development, a rotating speed of the photosensitive drums 153Y, 153M, 153C, and 153K, a condition at the time of charging, and a conveying speed of the sheet.

<Test Chart>

Figure 2:
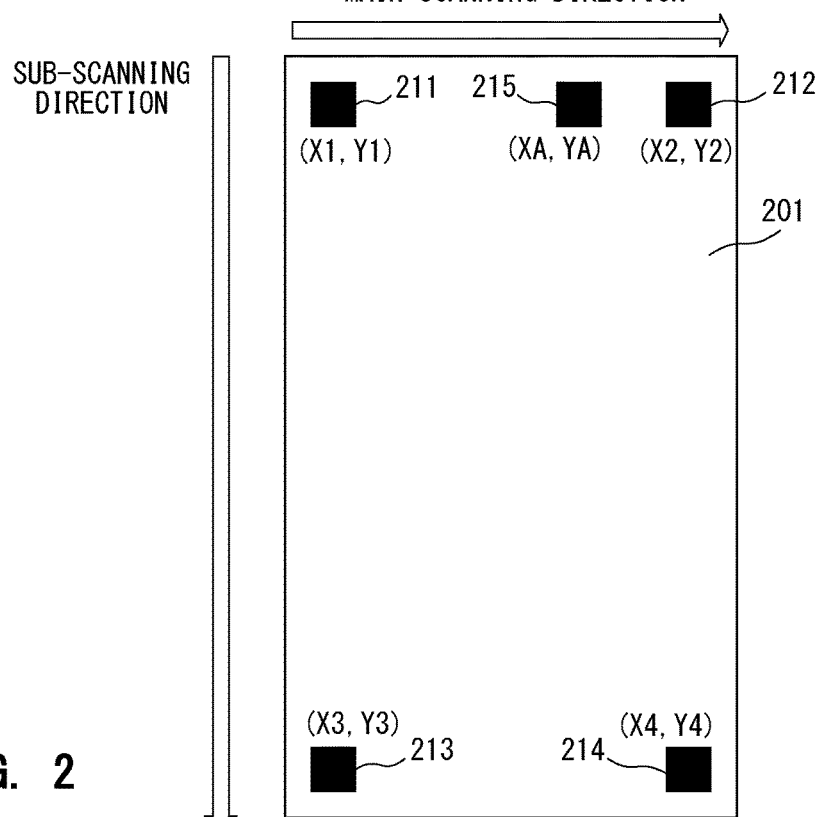
FIG. 2 is an exemplary view of a test chart.
Figure 3:
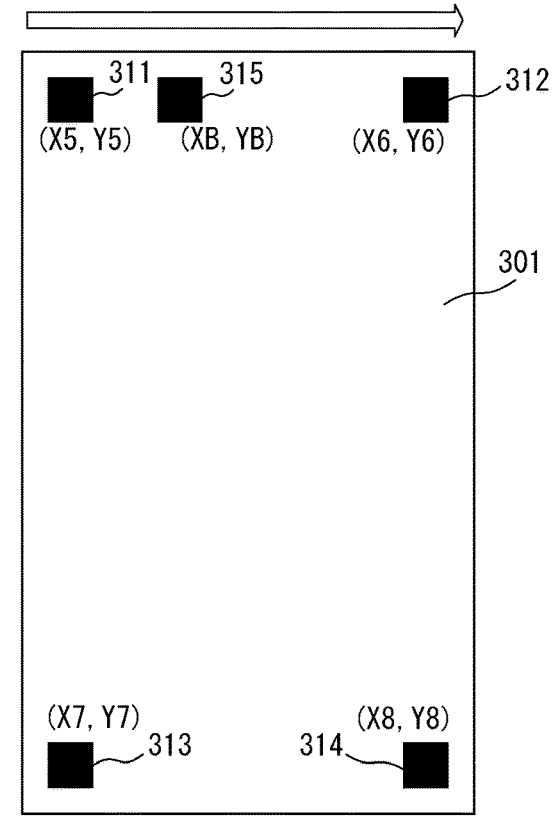
FIG. 3 is an exemplary view of the test chart.

FIG. 2 and FIG. 3 are exemplary views of the test chart. FIG. 2 exemplifies an adjusting image 201 printed on the front surface of the test chart (sheet). FIG. 3 exemplifies an adjusting image 301 printed on the back surface of the test chart (sheet). The adjusting image 201 and the adjusting image 301 include four patch images 211 to 214 and four patch images 311 to 314, respectively, for detecting the geometric characteristic of the image, at four corners in the vicinity of vertices of the sheet. Further, the adjusting image 201 and the adjusting image 301 include, in addition to the patch images 211 to 214 and 311 to 314 arranged at the four corners of the test chart, an identification image 215 and an identification image 315, respectively, for discriminating between the front surface and the back surface of the test chart. The identification image 215 on the front surface and the identification image 315 on the back surface are printed so as to be located at different positions within the read image. The image reading apparatus 101 can detect the positions of the identification images 215 and 315 from the reading result (read image) of the test chart so as to identify whether the read surface is the front surface or the back surface of the test chart, based on the positions of the identification images 215 and 315.

The main scanning direction and the sub-scanning direction of FIG. 2 and FIG. 3 are the main scanning direction and the sub-scanning direction at the time in a case where the image reading apparatus 101 and the ADF 102 read the test chart. The sub-scanning direction is the conveying direction of the test chart (or the moving direction of the first image reading unit). The geometric characteristic used in a case where the image forming apparatus 150 prints an image onto the sheet is adjusted based on the reading results of the test chart obtained by the image reading apparatus 101 and the ADF 102.

Description is given of correction of a variation in sub-scanning magnification of each paper type through use of such a test chart. In the first embodiment, in a case where the user gives an instruction to adjust misregistration of the printing positions on the front and back surfaces of the sheet, the image forming apparatus 150 prints the adjusting image 201 onto the front surface of the sheet and also prints the adjusting image 301 onto the back surface thereof, to thereby generate the test chart. The image reading apparatus 101 reads the test chart in the platen reading mode and the ADF reading mode. The sub-scanning magnification is obtained from a difference between a length in the sub-scanning direction (sub-scanning length) obtained from the reading result (read image) and an actual length in the sub-scanning direction (sub-scanning length). In order to correct this sub-scanning magnification, a sub-scanning magnification correction value is generated. The sub-scanning length is an interval of two patch images arranged side by side in the sub-scanning direction.

The conveying speed of the sheet 126 achieved by the ADF 102 has a variation depending on characteristics of the sheet 126, such as a basis weight and a surface property. Accordingly, a variation in sub-scanning magnification is caused depending on the paper type of the sheet 126. That is, in the ADF reading mode, the sub-scanning magnification varies depending on the paper type of the sheet 126. In the platen reading mode, the sheet 104 is read under a state in which the sheet 104 is placed on the platen 103 and is not conveyed. Accordingly, the sub-scanning length obtained from the read image acquired by the platen reading mode and the actual sub-scanning length are the same length.

The sub-scanning magnification can be acquired by comparing the sub-scanning length in the read image acquired by the platen reading mode and the sub-scanning length in the read image acquired by the ADF reading mode. After that, with the sub-scanning magnification correction value being set to the ADF 102, the patch images 211 to 214 and 311 to 314 on both surfaces of the test chart are read in the ADF reading mode. The misregistration of the printing positions of the patch images 211 to 214 and 311 to 314 on the front surface and the back surface is calculated based on the reading results of the patch images 211 to 214 and 311 to 314 on both the surfaces so that the misregistration of the printing positions on the front and back surfaces of the image forming apparatus is corrected with high accuracy. As described above, the sub-scanning magnification varies depending on each paper type of the sheet, but with the sub-scanning magnification correction value being generated for each sheet, the sub-scanning magnification can be accurately corrected.

Figure 4:
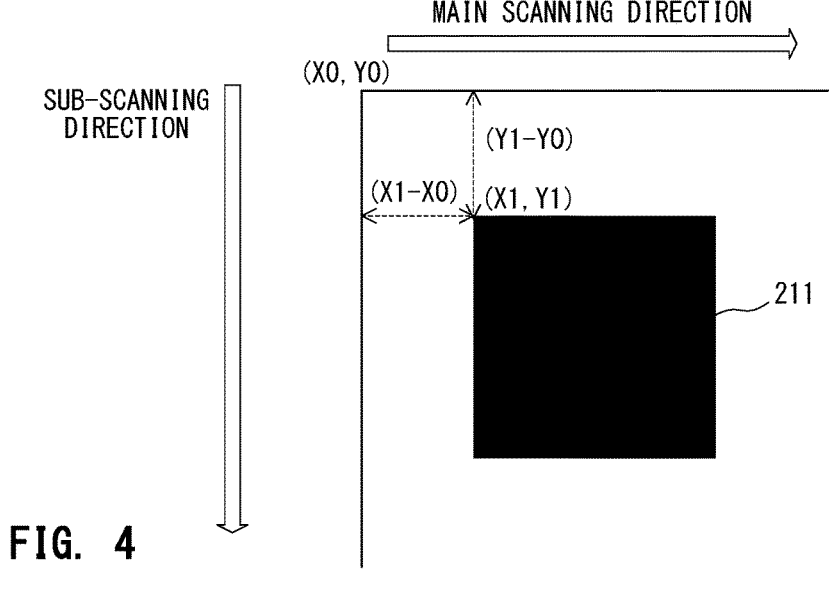
FIG. 4 is an explanatory view of a printing position of a patch image.
Figure 5:
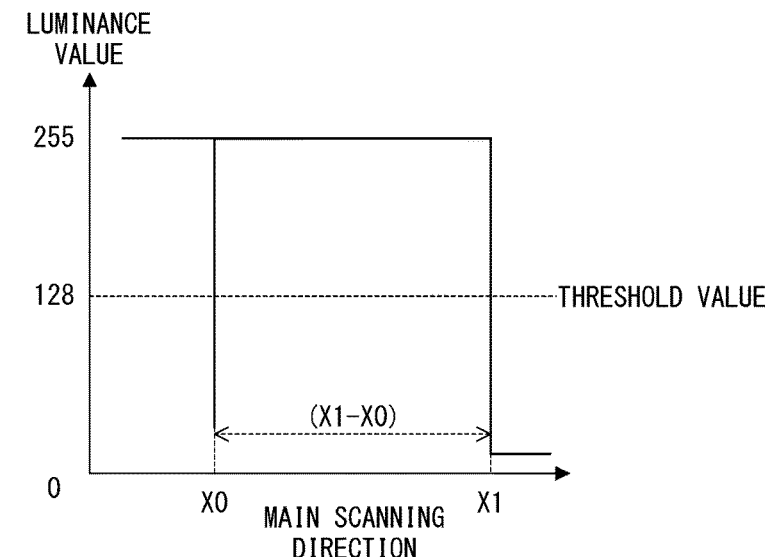
FIG. 5 is an explanatory graph of the printing position of the patch image.
Figure 6:
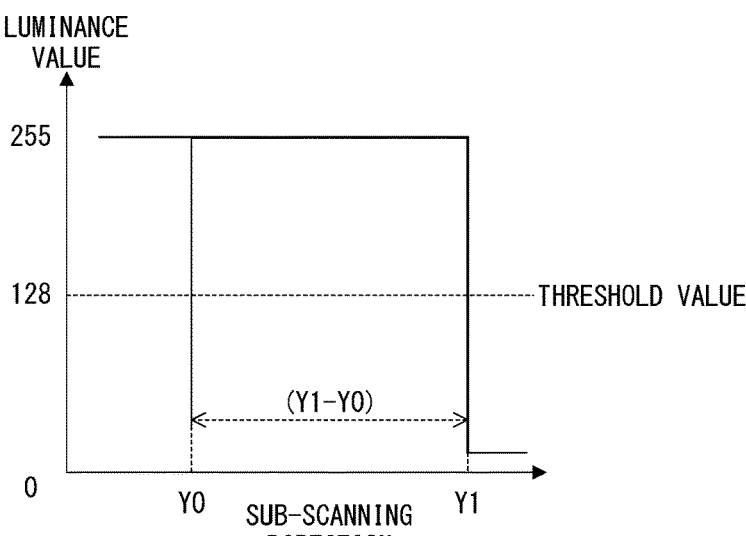
FIG. 6 is an explanatory graph of the printing position of the patch image.

FIG. 4, FIG. 5, and FIG. 6 are explanatory view and graphs of the printing position of the patch image 211 at the upper left of the test chart of FIG. 2. As illustrated in FIG. 4, a position (coordinates) of an upper-left vertex of the patch image 211 at the upper left of the test chart is expressed as (X1, Y1), with an upper-left vertex of the sheet being regarded as a reference (X0, Y0). An X coordinate indicates the main scanning direction, and a Y coordinate indicates the sub-scanning direction. The adjusting image 201 of the test chart is printed in black at an end portion of a white sheet. A luminance value included in the read image in a case where a background (white) of the sheet and a printed surface of the sheet are read is higher than a luminance value included in the read image in a case where the black patch image 211 is read. Accordingly, the patch image 211 can be detected by comparing the luminance value included in the reading result (read image) with a predetermined threshold value of the luminance value.

FIG. 5 exemplifies the change of the luminance value included in the reading result in the main scanning direction in a case where the patch image 211 is read. FIG. 6 exemplifies the change of the luminance value included in the reading result in the sub-scanning direction in a case where the patch image 211 is read. An edge part of the test chart (sheet) has a shadow when being irradiated with light at the time of reading, and hence the luminance value included in the reading result becomes lower than the luminance value of the background of the sheet and the printed surface of the sheet.

In FIG. 5 and FIG. 6, the luminance value of the reading result is expressed in 8 bits, and hence the luminance value is expressed by a value of from 0 to 255. The threshold value is set to "128." A range in which the luminance value is higher than the threshold value corresponds to the background of the test chart or the printed surface of the test chart, and a range in which the luminance value is lower than the threshold value corresponds to the edge part of the test chart or the patch image 211. FIG. 5 and FIG. 6 show that, at X0 in the main scanning direction of FIG. 5 and Y0 in the sub-scanning direction of FIG. 6, the luminance value is reduced due to the edge part of the test chart. Further, FIG. 5 and FIG. 6 show that, at X1 in the main scanning direction of FIGS. 5 and Y1 in the sub-scanning direction of FIG. 6, the luminance value is reduced due to the patch image 211.

As described above, the edge part of the test chart and the patch image 211 are detected through comparison between the luminance value and the threshold value. X0 in the main scanning direction and Y0 in the sub-scanning direction represent a boundary between the printed surface and the background of the test chart, and X1 in the main scanning direction and Y1 in the sub-scanning direction represent a boundary between the printed surface of the test chart and the patch image 211. Accordingly, a difference between X1 and X0 in the main scanning direction becomes a distance (X1–X0) from the edge of the test chart in the main scanning direction to the patch image 211. A difference between Y1 and Y0 in the sub-scanning direction becomes a distance (Y1–Y0) from the edge of the test chart in the sub-scanning direction to the patch image 211.

Also for the patch images 212, 213, and 214 at the lower left, the upper right, and the lower right of the test chart, similarly, the distance from the edge of the test chart in the main scanning direction to each of the patch images 212, 213, and 214 and the distance from the edge of the test chart in the sub-scanning direction to each of the patch images 212, 213, and 214 are detected based on results of comparison between the luminance value and the threshold value. As described above, the positions (X1, Y1), (X2, Y2), (X3, Y3), and (X4, Y4) of the patch images are detected (see FIG. 2).

Figure 7:
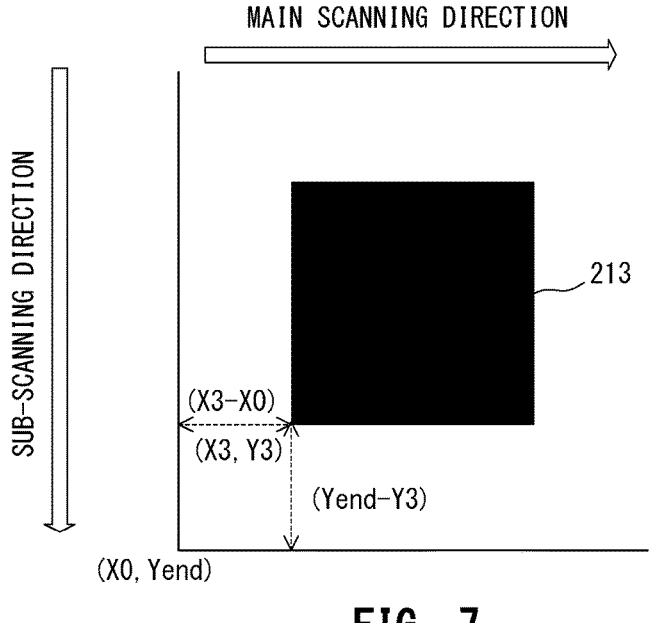
FIG. 7 is an explanatory view of a printing position of a patch image.

FIG. 7 is an explanatory view of the printing position of the patch image 213 at the lower left of the test chart of FIG. 2. The printing position of this patch image 213 is expressed by, with the upper-left vertex of the sheet being regarded as the reference (X0, Y0), coordinates (X3, Y3) of a lower-left vertex of this patch image 213. A lower-left end portion of the test chart is expressed by coordinates (X0, Yend).

Similarly to FIG. 4, FIG. 5, and FIG. 6, a coordinate of an edge X0 in the main scanning direction of the test chart is subtracted from a coordinate of a boundary X3 between the printed surface of the test chart and the patch image 213 so that a distance (X3–X0) from the edge of the test chart on the left side to the lower-left patch image 213 is calculated. Further, a coordinate of a boundary Y3 between the printed surface of the test chart and the patch image 213 is subtracted from a coordinate of an edge Yend in the sub-scanning direction of the test chart so that a distance (Yend–Y3) from the edge of the test chart on the lower side to the lower-left patch image 213 is calculated.

<Sub-Scanning Magnification>

Description is given of processing of detecting the sub-scanning magnification. As described above, the sub-scanning magnification is detected from the reading result acquired by the platen reading mode and the reading result

Figure 8:
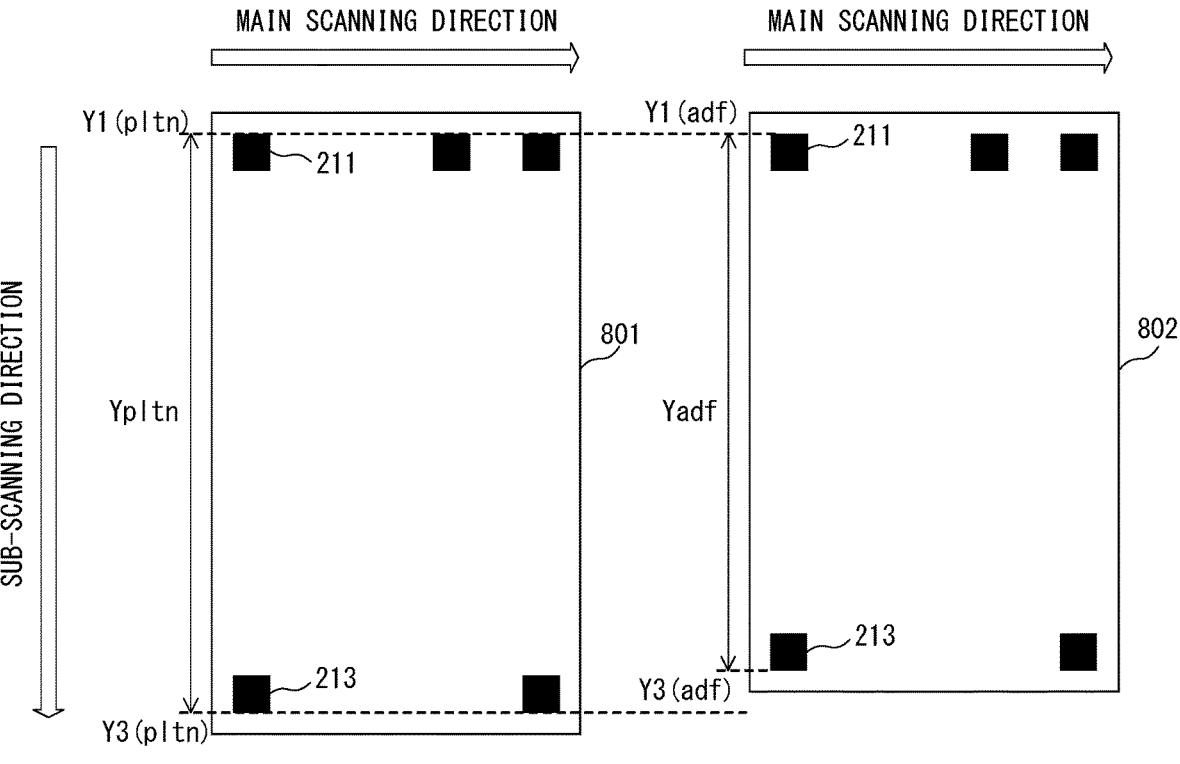
FIG. 8 is an explanatory view of sub-scanning magnification.

11 acquired by the ADF reading mode. In this case, description is given of an example in which the sub-scanning magnification is detected based on the printing positions of the patch images 211 and 213 at the upper left and the lower left, which are obtained by reading the test chart in the platen reading mode, and the printing positions of the patch images 211 and 213 at the upper left and the lower left, which are obtained by reading the test chart in the ADF reading mode. The sub-scanning magnification can be similarly detected even through use of the patch images 212 and 214 at the upper right and the lower right. Further, a combination of the patch images 211 and 214 at the upper left and the lower right, or a combination of the patch images 212 and 213 at the upper right and the lower left may be used. In any of the cases, the sub-scanning magnification can be detected based on the positions of two patch images printed at positions different from each other in the sub-scanning direction. As described above, the printing position of the patch image 211 at the upper left is expressed by coordinates of (X1, Y1), and the printing position of the patch image 213 at the lower left is expressed by coordinates of (X3, Y3). FIG. 8 is an explanatory view of the sub-scanning magnification.

A sub-scanning length of a reading result (read image 801) acquired by the platen reading mode is represented by Ypltn, a printing position in the sub-scanning direction of the patch image 211 at the upper left of the test chart is represented by a coordinate Y1(pltn), and a printing position in the sub-scanning direction of the patch image 213 at the lower left is represented by a coordinate Y3(pltn). The sub-scanning length Ypltn is expressed by (Equation 1) below.

$$Ypltn = Y3(pltn) - Y1(pltn) \qquad \text{(Equation 1)}$$

A sub-scanning length of a reading result (read image 802) acquired by the ADF reading mode is represented by Yadf, a printing position in the sub-scanning direction of the patch image 211 at the upper left of the test chart is represented by a coordinate Y1(adf), and a printing position in the sub-scanning direction of the patch image 213 at the lower left is represented by a coordinate Y3(adf). The sub-scanning length Yadf is expressed by (Equation 2) below.

$$Yadf = Y3(adf) - Y1(adf) \qquad \text{(Equation 2)}$$

In the first embodiment, as an example, description is given of a case in which the sub-scanning length Ypltn detected in the platen reading mode is longer than the sub-scanning length Yadf detected in the ADF reading mode (Ypltn> Yadf). In this case, the read image 801 which is the reading result of the test chart acquired by the platen reading mode has a sub-scanning length longer than that of the read image 802 which is the reading result of the test chart acquired by the ADF reading mode. The difference between those sub-scanning lengths is the sub-scanning magnification. A sub-scanning magnification correction value Vrate for correcting this sub-scanning magnification is expressed by (Equation 3) below.

$$V\text{rate} = Yadf/Ypltn \qquad \text{(Equation 3)}$$

12

The sub-scanning magnification is corrected through use of such a sub-scanning magnification correction value. In the first embodiment, the conveying speed of the sheet 126 (test chart) achieved by the ADF 102 is corrected based on the sub-scanning magnification correction value so that the sub-scanning magnification is corrected.

The image reading apparatus 101 performs the reading processing by the first image reading unit 111 in synchronization with a main-scanning synchronization signal generated at a certain timing. Accordingly, the sub-scanning length can be changed by changing the conveying speed of the sheet 126 achieved by the ADF 102.

When Ypltn> Yadf is satisfied, the sub-scanning magnification correction value Vrate calculated by (Equation 3) above becomes a value smaller than "1". In this case, regarding the conveying speed of the sheet 126 achieved by the ADF 102, in a case where a speed before the sub-scanning magnification correction is represented by V1, a conveying speed V2 after the sub-scanning magnification correction is expressed by (Equation 4) below.

$$V2 = V1 * V\text{rate} \qquad \text{(Equation 4)}$$

In a case where the sub-scanning magnification correction value Vrate is smaller than "1", the conveying speed V2 after the correction, which is calculated by (Equation 4), is a speed slower than the conveying speed V1 before the correction (V1>V2). Thus, in a case where Ypltn>Yadf is satisfied, the conveying speed of the sheet 126 achieved by the ADF 102 is decreased in a case where the sub-scanning magnification correction is performed. The first image reading unit 111 performs the reading processing at a certain timing in synchronization with the main-scanning synchronization signal, and hence decreasing the conveying speed of the sheet 126 causes an increase of the sub-scanning length Yadf of the read image of the sheet 126. Specifically, the sub-scanning length Yadf of the read image read by the ADF reading mode becomes longer by a rate of the sub-scanning magnification correction value Vrate calculated by (Equation 3).

That is, the sub-scanning magnification correction value Vrate is a rate for matching the sub-scanning length Yadf of the read image acquired by the ADF reading mode with the sub-scanning length Ypltn of the read image acquired by the platen reading mode. In this manner, the sub-scanning length of the read image acquired by the ADF reading mode and the sub-scanning length of the read image acquired by the platen reading mode become substantially the same. As described above, the sub-scanning magnification is corrected so that the sub-scanning lengths of the read images become substantially the same regardless of the reading mode.

Under a state in which the sub-scanning magnification is corrected, the first image reading unit 111 and the second image reading unit 137 re-read the adjusting image 201 printed on the front surface of the test chart and the adjusting image 301 printed on the back surface thereof. A correction value for correcting the geometric characteristic of the image printed by the image forming apparatus 150 is generated based on the read image of the front surface and the read image of the back surface. The sub-scanning magnification is corrected, and hence the misregistration amount of the printing position and the misregistration amount of the printing positions on the front and back surfaces are accurately detected. Thus, the correction value capable of correcting the geometric characteristic with high accuracy can be obtained.

The misregistration of the printing position on the front surface is detected based on the positions (coordinates (X1, Y1), (X2, Y2), (X3, Y3), and (X4, Y4)) of the respective patch images 211 to 214 detected from the read image of the adjusting image 201 (FIG. 2) on the front surface of the test chart obtained by the first image reading unit 111. The difference between the position of each of the patch images 211 to 214 detected from the read image and the position of each of the patch images 211 to 214 at the time in a case where there is no misregistration of the printing position corresponds to the misregistration amount of the printing position on the front surface. The misregistration of the printing position on the front surface is corrected through use of a correction value that allows the misregistration amount of the printing position on the front surface to come close to "0".

The misregistration of the printing position on the back surface is detected based on the positions (coordinates (X5, Y5), (X6, Y6), (X7, Y7), and (X8, Y8)) of the respective patch images 311 to 314 detected from the read image of the adjusting image 301 (FIG. 3) on the back surface of the test chart obtained by the second image reading unit 137. The difference between the position of each of the patch images 311 to 314 detected from the read image and the position of each of the patch images 311 to 314 at the time in a case where there is no misregistration of the printing position corresponds to the misregistration amount of the printing position on the back surface. The misregistration of the printing position on the back surface is corrected through use of a correction value that allows the misregistration amount of the printing position on the back surface to come close to 0.

The misregistration of the printing positions on the front and back surfaces is detected based on the positions (coordinates (X1, Y1), (X2, Y2), (X3, Y3), and (X4, Y4) and coordinates (X5, Y5), (X6, Y6), (X7, Y7), and (X8, Y8)) of the respective patch images 211 to 214 and 311 to 314 detected from the respective read images. A correction value for the misregistration of the printing positions on the front and back surfaces is detected based on the positions (coordinates) of the respective patch images 211 to 214 and 311 to 314.

The patch image 211 at the upper left of the front surface and the patch image 311 at the upper left of the back surface correspond to each other, and the coordinates (X1, Y1) and the coordinates (X5, Y5) are compared to each other so that a misregistration amount of upper-left printing positions on the front and back surfaces is detected. The patch image 212 at the upper right of the front surface and the patch image 312 at the upper right of the back surface correspond to each other, and the coordinates (X2, Y2) and the coordinates (X6, Y6) are compared to each other so that a misregistration amount of upper-right printing positions on the front and back surfaces is detected. The patch image 213 at the lower left of the front surface and the patch image 313 at the lower left of the back surface correspond to each other, and the coordinates (X3, Y3) and the coordinates (X7, Y7) are compared to each other so that a misregistration amount of lower-left printing positions on the front and back surfaces is detected. The patch image 214 at the lower right of the front surface and the patch image 314 at the lower right of the back surface correspond to each other, and the coordinates (X4, Y4) and the coordinates (X8, Y8) are compared to each other so that a misregistration amount of lower-right printing positions on the front and back surfaces is detected. A misregistration correction value for the printing positions on the front and back surfaces is determined based on the misregistration amount of the printing positions on the front and back surfaces at each position.

In the image forming apparatus 150, for example, in a case where the sheet passing through the secondary transfer portion 158 is skewed, the toner images are transferred in an inclined manner onto the sheet. Further, for example, in a case where the distribution of the pressure force applied by the fixing device 159 is uneven, the sheet that has passed through the fixing device 159 is deformed. In this case, the size of the image formed on the front surface of the sheet and the size of the image formed on the back surface thereof may become different from each other. In those cases, the printing position of the image formed on the front surface and the printing position of the image formed on the back surface become different from each other. In order to cancel out the misregistration of the printing positions on the front and back surfaces, the image forming apparatus 150 performs correction through use of the misregistration correction value for the printing positions on the front and back surfaces.

<Control System>

Figure 9:
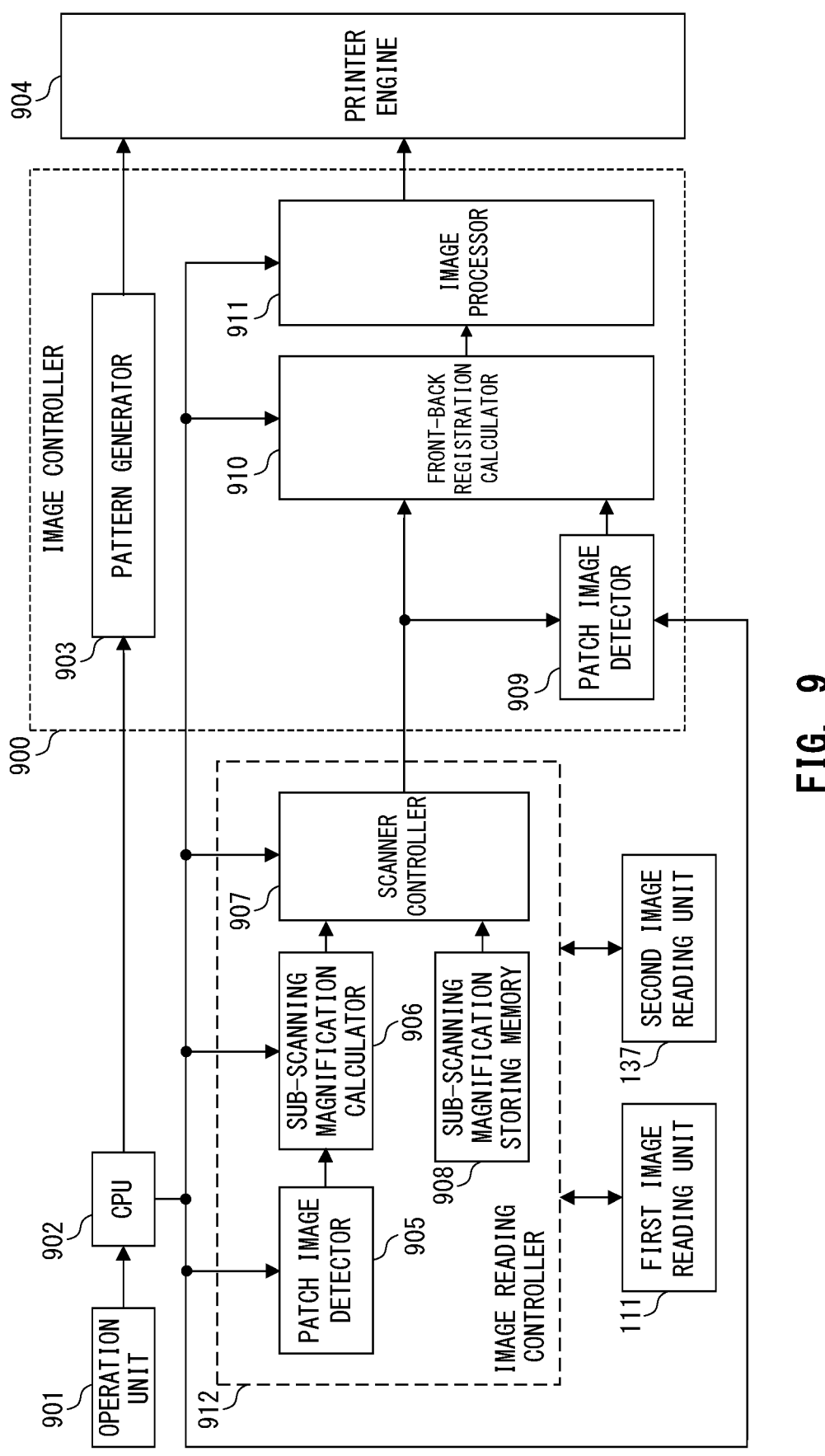
FIG. 9 is an explanatory diagram of a control system.

FIG. 9 is an explanatory diagram of a control system. In the first embodiment, description is given of a function of correcting the misregistration of the printing positions on the front and back surfaces by the control system, but the control system can control various operations to be performed by the image forming apparatus 150, the image reading apparatus 101, and the ADF 102.

A central processing unit (CPU) 902 is a main control device for controlling the operations of the image forming apparatus 150, the image reading apparatus 101, and the ADF 102. The CPU 902 executes a predetermined computer program to control the operations of the image forming apparatus 150, the image reading apparatus 101, and the ADF 102. An operation unit 901, an image controller 900, and an image reading controller 912 are connected to the CPU 902. The CPU 902 and the image controller 900 are incorporated in, for example, the image forming apparatus 150. The image reading controller 912 is incorporated in the image reading apparatus 101.

The operation unit 901 is an input interface for receiving the instruction from the user. The operation unit 901 is formed of various key buttons or a touch panel. The operation unit 901 includes a display as an output interface.

The image controller 900 operates in response to the instruction from the CPU 902 to perform various types of image processing on the image data representing the image corresponding to the print job. In the first embodiment, with the image processing performed by the image controller 900, the geometric characteristic of the image such as the misregistration of the printing positions on the front and back surfaces is corrected. The image controller 900 includes a pattern generator 903, a patch image detector 909, a front-back registration calculator 910, and an image processor 911. The image controller 900 is connected to a printer engine 904, and transmits image data subjected to image processing to the printer engine 904. The printer engine 904 includes each unit for causing the image forming apparatus 150 to perform the above-mentioned image formation.

The pattern generator 903 generates the image data representing the adjusting images 201 and 301 for generating the test chart. The image data representing the adjusting images 201 and 301 is stored in, for example, a memory inside of the pattern generator 903, and is transmitted to the printer engine 904 as required. The image data representing the adjusting images 201 and 301 is directly transmitted to the printer engine 904 without passing through the image processor 911, and hence the various types of image processing are not performed thereon. The printer engine 904 prints the adjusting images 201 and 301 onto the sheet to generate the test chart, based on the image data acquired from the pattern generator 903.

The patch image detector 909 detects the positions of the patch images 211 to 214 and 311 to 314 on the front and back surfaces of the test chart from the reading results of the test chart obtained by the first image reading unit 111 and the second image reading unit 137. The front-back registration calculator 910 calculates a misregistration correction value for correcting the misregistration of the printing positions of the respective images on the front surface and the back surface, based on the positions of the patch images 211 to 214 and 311 to 314 detected by the patch image detector 909. The image processor 911 corrects the image data instructed by the print job through use of the misregistration correction value calculated by the front-back registration calculator 910, and transmits the corrected image data to the printer engine 904. With such processing, the printer engine 904 can form an image whose printing positions of the respective images on the front surface and the back surface are matched onto the sheet.

The misregistration of the printing position of the image at the time of simplex printing is also similarly corrected. In this case, the patch image detector 909 detects the positions of the patch images 211 to 214 on the front surface of the test chart from the reading result of the test chart obtained by the first image reading unit 111. The front-back registration calculator 910 calculates a correction value for correcting the difference between the position of each of the patch images 211 to 214 detected by the patch image detector 909 and the position of each of the patch images 211 to 214 in a case where no misregistration occurs. The image processor 911 corrects the image data instructed by the print job through use of the correction value calculated by the front-back registration calculator 910, and transmits the corrected image data to the printer engine 904. With such processing, the printer engine 904 can form an image whose misregistration of the printing position has been corrected onto the front surface of the sheet.

The image reading controller 912 is controlled by the CPU 902 to control the reading processing to be performed by the first image reading unit 111 and the second image reading unit 137 so that the sheets 126 and 104 are read. The image reading controller 912 includes a patch image detector 905, a sub-scanning magnification calculator 906, a sub-scanning magnification storing memory 908, and a scanner controller 907.

The patch image detector 905 detects the positions of the patch images 211 to 214 from the reading result of the test chart obtained by the first image reading unit 111. The first image reading unit 111 reads the test chart by the platen reading mode and the ADF reading mode. The patch image detector 905 detects the position of each of the patch images 211 to 214 from the read image of the test chart read by each of the reading modes.

The sub-scanning magnification calculator 906 calculates the sub-scanning magnification correction value based on the positions of the patch images 211 to 214 in each of the platen reading mode and the ADF reading mode, which have been detected by the patch image detector 905. The sub-scanning magnification storing memory 908 stores in advance an initial value (sub-scanning magnification initial value) of the sub-scanning magnification correction value. For example, in a case where an image is printed on plain paper, the scanner controller 907 performs sub-scanning magnification correction through use of the sub-scanning magnification initial value stored in the sub-scanning magnification storing memory 908. In a case where an image is printed on a sheet having a conveying speed different by a predetermined speed or more from the conveying speed of the plain paper, the scanner controller 907 performs sub-scanning magnification correction through use of the sub-scanning magnification correction value calculated by the sub-scanning magnification calculator 906.

Description is given of a case in which the printing positions on the front and back surfaces are corrected by the control system having the above-mentioned configuration. The user places sheets to be used into the first sheet feeding cassette 151 or the second sheet feeding cassette 152, and gives an instruction to execute a print job of generating the test chart through the operation unit 901. In a case where the CPU 902 acquires this instruction from the operation unit 901, the CPU 902 causes the pattern generator 903 to transmit the image data of the adjusting images 201 and 301 to the printer engine 904. The printer engine 904 prints the adjusting image 201 onto the first surface (front surface) of the sheet based on the image data of the adjusting image 201, and prints the adjusting image 301 onto the second surface (back surface) of the sheet based on the image data of the adjusting image 301. Thus, the test chart is generated.

The image reading apparatus 101 reads the test chart by each of the platen reading mode and the ADF reading mode. The patch image detector 905 detects the printing position (coordinates) of each of the patch images 211 to 214 printed on the test chart, based on the read image which is the reading result obtained by each reading mode. The sub-scanning magnification calculator 906 detects the sub-scanning length based on the detected printing position of each of the patch images 211 to 214, and thus generates the sub-scanning magnification correction value.

The scanner controller 907 acquires the sub-scanning magnification initial value stored in the sub-scanning magnification storing memory 908 and the sub-scanning magnification correction value calculated by the sub-scanning magnification calculator 906. At the time of printing onto plain paper, the CPU 902 causes the scanner controller 907 to select the sub-scanning magnification initial value, and, at the time of printing onto a sheet having a conveying speed different from that of the plain paper, the CPU 902 causes the scanner controller 907 to select the sub-scanning magnification correction value. Thus, the CPU 902 causes the scanner controller 907 to perform the sub-scanning magnification correction. The scanner controller 907 corrects the sub-scanning magnification based on the sub-scanning magnification correction value calculated by the sub-scanning magnification calculator 906.

After the sub-scanning magnification correction, the user causes the first image reading unit 111 and the second image reading unit 137 to read the front surface and the back surface of the test chart. The image controller 900 causes the patch image detector 909 to detect the coordinates of the printing positions of the respective patch images 211 to 214 and 311 to 314 on the front surface and the back surface from the respective read images obtained by the first image reading unit 111 and the second image reading unit 137. The front-back registration calculator 910 calculates the misregistration correction value for the printing positions on the front and back surfaces based on the detected coordinates of the printing positions, and transmits the calculated misregistration correction value to the image processor 911. The image processor 911 transmits the image data corrected based on the misregistration correction value calculated by the front-back registration calculator 910 to the printer engine 904.

Figure 10:
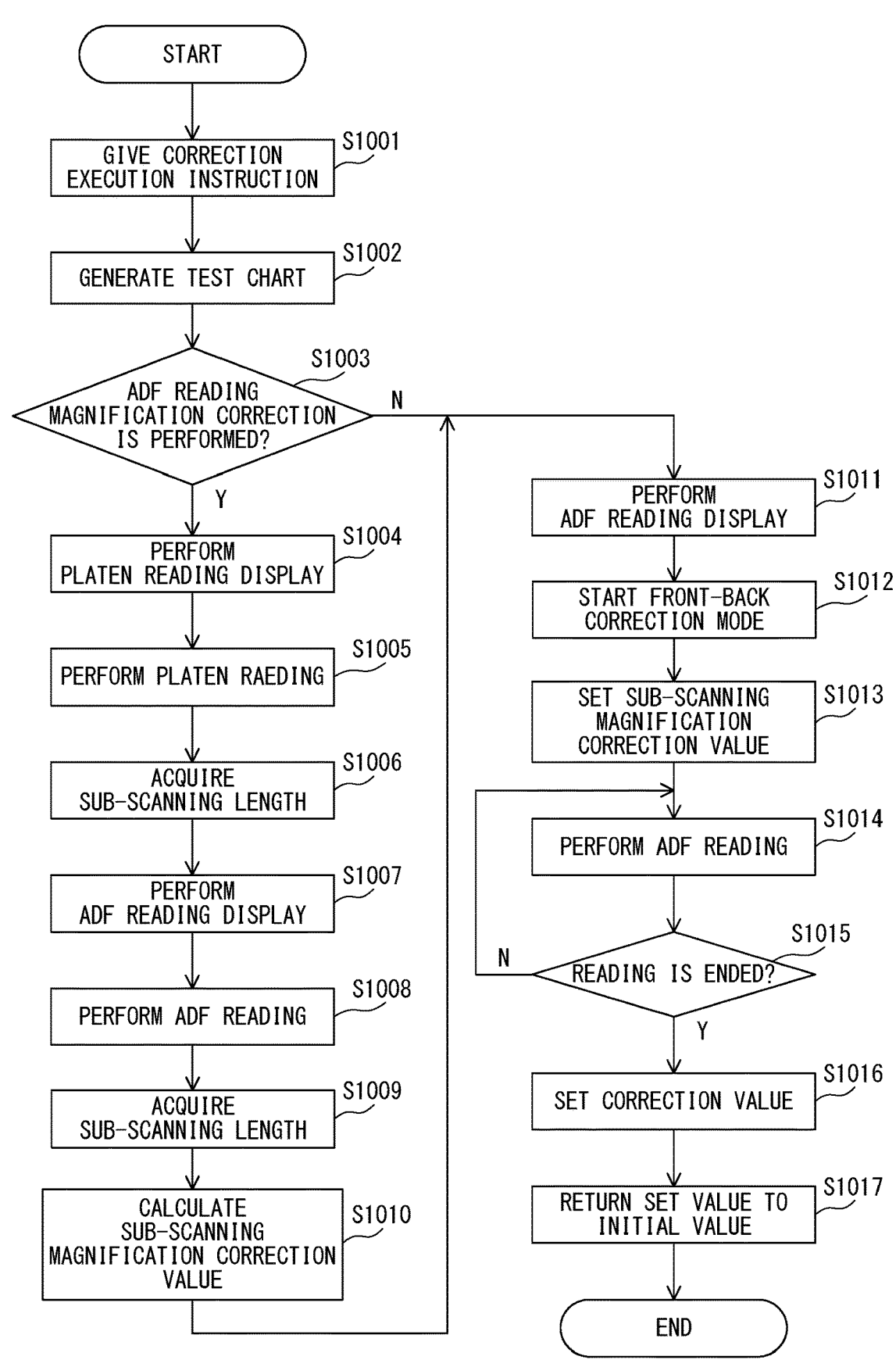
FIG. 10 is a flow chart for illustrating processing of correcting misregistration of printing positions on front and back surfaces.

FIG. 10 is a flow chart for illustrating the processing of correcting the misregistration of the printing positions on the front and back surfaces.

The CPU 902 acquires an instruction to execute correction of the misregistration of the printing positions on the front and back surfaces from the operation unit 901 (Step S1001). This instruction includes an instruction to generate the test chart. The CPU 902 causes the pattern generator 903 to transmit the image data of the adjusting images 201 and 301 to the printer engine 904, and causes the printer engine 904 to generate the test chart (Step S1002).

After the test chart is generated, the CPU 902 determines whether or not an "ADF reading magnification correction" button displayed on the display of the operation unit 901 has been pressed (Step S1003). The "ADF reading magnification correction" button is a button for giving an instruction regarding whether or not to generate the sub-scanning magnification correction value. For example, the sub-scanning magnification correction value is generated in a case where printing is performed onto a sheet other than plain paper.

In a case where the "ADF reading magnification correction" button is pressed (Step S1003: Y), the CPU 902 displays, on the display of the operation unit 901, an instruction to place the test chart on the platen 103 (platen reading display) (Step S1004). The user places the test chart on the platen 103 in accordance with the platen reading display, and gives an instruction to read (scan) the test chart by the platen reading mode. In this manner, the CPU 902 causes the first image reading unit 111 to perform the image reading processing (pre-scanning) by the platen reading mode (Step S1005). The CPU 902 causes the patch image detector 905 to detect the positions of the patch images 211 to 214 based on the read image, and causes the sub-scanning magnification calculator 906 to acquire the sub-scanning length of the read image acquired by the platen reading mode based on the positions of the patch images 211 to 214 (Step S1006). As described above, the sub-scanning length of the read image is acquired by the platen reading mode.

After that, the CPU 902 displays, on the display of the operation unit 901, an instruction to place the test chart on the original tray 105 of the ADF 102 (ADF reading display) (Step S1007). The user places the test chart on the original tray 105 in accordance with the ADF reading display, and gives an instruction to read (scan) the test chart by the ADF reading mode. In this manner, the CPU 902 causes the first image reading unit 111 to perform the image reading processing (pre-scanning) by the ADF reading mode (Step S1008). The CPU 902 causes the patch image detector 905 to detect the positions of the patch images 211 to 214 based on the read image, and causes the sub-scanning magnification calculator 906 to acquire the sub-scanning length of the read image acquired by the ADF reading mode based on the positions of the patch images 211 to 214 (Step S1009). As described above, the sub-scanning length of the read image is acquired by the ADF reading mode. The user places the test chart on the platen 103 and the original tray 105 so that the adjusting image on the same surface of the test chart is read in the process step of Step S1005 and the process step of Step S1008.

The CPU 902 causes the sub-scanning magnification calculator 906 to calculate the sub-scanning magnification correction value based on the sub-scanning length of the read image acquired by the platen reading mode and the sub-scanning length of the read image acquired by the ADF reading mode (Step S1010). The CPU 902 that has acquired the sub-scanning magnification correction value displays, on the display of the operation unit 901, an instruction to place the test chart on the original tray 105 of the ADF 102 (ADF reading display) (Step S1011). In a case where the "ADF reading magnification correction" button is not pressed (Step S1003: N), the CPU 902 displays the ADF reading display on the display of the operation unit 901 without performing the process steps of from Step S1004 to Step S1010 for acquiring the sub-scanning magnification correction value (Step S1011).

After that, the CPU 902 starts the operation in a front-back correction mode (Step S1012). In the front-back correction mode, the adjusting images on the front and back surfaces of the test chart are read in the ADF reading mode, and the misregistration correction value for the printing positions on the front and back surfaces is generated based on the read images. In this case, the CPU 902 sets the sub-scanning magnification correction value or the sub-scanning magnification initial value to the scanner controller 907 (Step S1013). In a case where the "ADF reading magnification correction" button is pressed, the CPU 902 sets the sub-scanning magnification correction value, and, in a case where the "ADF reading magnification correction" button is not pressed, the CPU 902 sets the sub-scanning magnification initial value. The scanner controller 907 adjusts the conveying speed of the test chart achieved by the ADF 102, based on the sub-scanning magnification correction value or the sub-scanning magnification initial value. The sub-scanning magnification is corrected by adjusting the conveying speed.

The CPU 902 causes the first image reading unit 111 and the second image reading unit 137 to read both surfaces of the test chart in the ADF reading mode (Step S1014). The reading result obtained here is a read image reflecting the sub-scanning magnification correction. The scanner controller 907 transmits the read image obtained after the sub-scanning magnification correction to the image controller 900. The CPU 902 repeats the reading of the test chart through use of the ADF 102 until all of the test charts placed on the original tray 105 are read (Step S1015: N).

In a case where all of the test charts placed on the original tray 105 are read (Step S1015: Y), the CPU 902 causes the front-back registration calculator 910 to calculate the correction value for the printing positions on the front and back surfaces, and sets the calculated correction value to the image processor 911 (Step S1016). The patch image detector 909 detects the printing positions of the patch images 211 to 214 and 311 to 314 from the respective read images of the front surface and the back surface. The front-back registration calculator 910 calculates the misregistration correction value for the printing positions on the front and back surfaces based on the printing positions detected by the patch image detector 909. The image processor 911 corrects the image forming condition based on the calculated misregistration correction value so that the printing positions on the front and back surfaces can be adjusted. In the case of simplex printing, the printing position of the image on one surface may be adjusted. The CPU 902 returns the sub-scanning magnification correction value set to the scanner controller 907 to the sub-scanning magnification initial value stored in the sub-scanning magnification storing memory 908 (Step S1017). As described above, the correction processing for correcting the misregistration of the printing positions on the front and back surfaces is ended.

The processing of FIG. 10 shows an example in which the operation in the platen reading mode (Step S1004 to Step S1006) is first performed, and then the operation in the ADF reading mode (Step S1007 to Step S1009) is performed, but those operations may be performed in a reversed order. That is, first, the sub-scanning length may be acquired from the read image acquired by the ADF reading mode, and then the sub-scanning length may be acquired from the read image acquired by the platen reading mode.

In the first embodiment, in a case where the variation in sub-scanning magnification depending on the paper type of the test chart is to be corrected, the reading results (read images) of the adjusting image printed on the same surface of the sheet, which are acquired by the platen reading mode and the ADF reading mode, are used. That is, in a case where the variation in sub-scanning magnification depending on the paper type of the test chart is to be corrected, the reading results (read images) of the adjusting image 201 printed on the front surface of the sheet or the reading results (read images) of the adjusting image 301 printed on the back surface of the sheet are used. In a case where the adjusting images on different surfaces of the test chart are read in the platen reading mode and the ADF reading mode, the sub-scanning magnification correction is inaccurately performed. For example, in a case where the adjusting image 201 printed on the front surface of the sheet is read in the platen reading mode and the adjusting image 301 printed on the back surface of the sheet is read in the ADF reading mode, the sub-scanning magnification correction is inaccurately performed.

In order to prevent the adjusting images on different surfaces from being read, in the first embodiment, the identification images 215 and 315 are added to the respective adjusting images 201 and 301 so that whether the read adjusting image is the front surface or the back surface of the test chart can be identified from the reading result (read image). The identification image 215 on the front surface and the identification image 315 on the back surface are located at different positions on the read image. Accordingly, through use of the detection result of the printing position obtained by the patch image detector 905, whether the read image is the front surface or the back surface of the test chart can be identified. In a case where the adjusting images on different surfaces are read as a result of the identification, the user is caused to check the surface to be read of the test chart, and the image reading processing is performed again.

In the first embodiment, in a case where the variation in sub-scanning magnification depending on the paper type of the test chart is to be corrected, the first image reading unit 111 performs the image reading processing in the platen reading mode and the ADF reading mode. The reading in the ADF reading mode may be performed through use of the second image reading unit 137.

As described above, before the misregistration of the printing position of the image of the sheet is measured, the sub-scanning magnification is corrected depending on the sheet to be actually used. Accordingly, the variation in sub-scanning magnification can be suppressed regardless of the type of the sheet, and thus the sub-scanning magnification can be accurately corrected. In this manner, the geometric characteristic such as the misregistration of the printing positions on the front and back surfaces of the sheet can be corrected with high accuracy.

Second Embodiment

Configurations of the image reading apparatus 101, the ADF 102, and the image forming apparatus 150 according to a second embodiment of the present disclosure are similar to those of the first embodiment, and hence description thereof is omitted. Further, the same applies also to the control system. The image reading apparatus 101 and the ADF 102 can perform the image reading processing by the platen reading mode and the ADF reading mode, similarly to the first embodiment.

Figure 11:
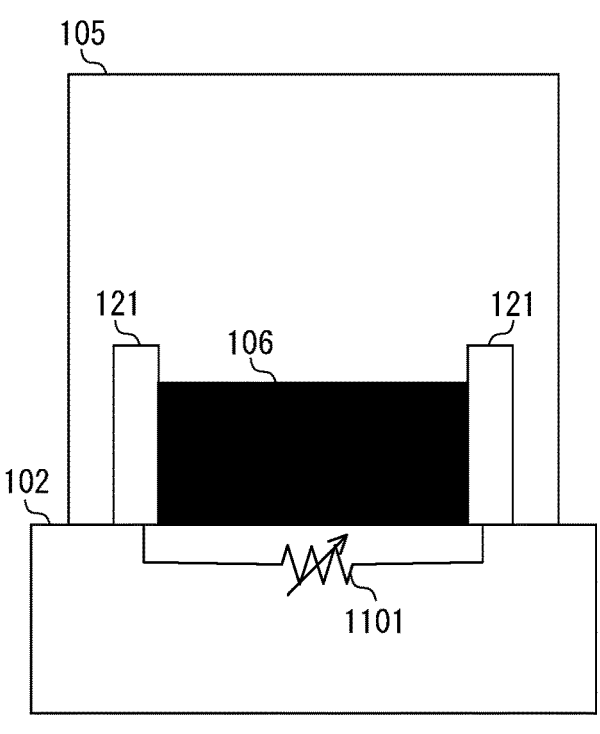
FIG. 11 is an explanatory view of a sheet width of a sheet placed on an original tray.

FIG. 11 is an explanatory view of a length in the main scanning direction (hereinafter referred to as "sheet width") of the sheet bundle 106 (sheet 126) placed on the original tray 105. The sheet bundle 106 placed on the original tray 105 is brought into abutment against two width regulating plates 121 in order to suppress the skew feeding at the time of conveyance. The sheet width of the sheet bundle 106 becomes equal to an interval between the two width regulating plates 121. In order to detect the sheet width, a variable resistor 1101 such as a volume resistor whose resistance value is variable in association with the interval between the two width regulating plates 121 is mounted between the two width regulating plates 121.

The interval between the width regulating plates 121 can be measured through use of a voltage value that changes in accordance with the resistance value of the variable resistor 1101. That is, the sheet width of the sheet bundle 106 can be detected through use of the voltage value that changes in accordance with the resistance value of the variable resistor 1101.

Figure 12:
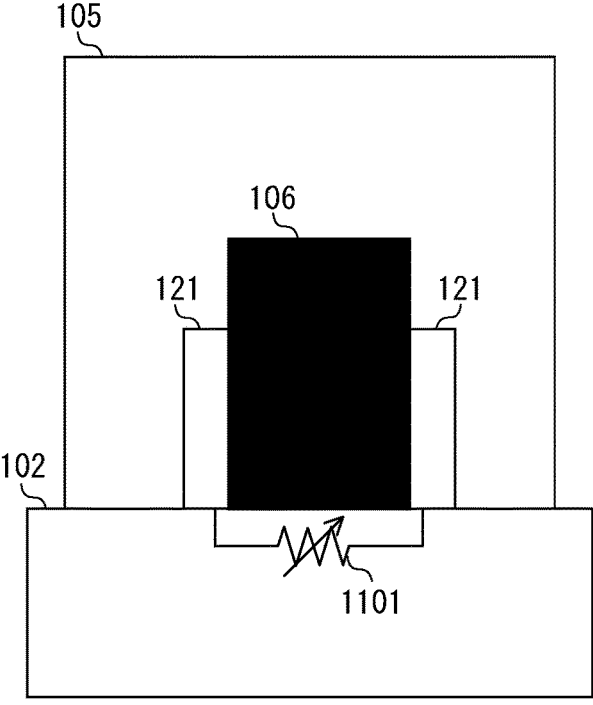
FIG. 12 is an explanatory view of the sheet width.

FIG. 12 is an explanatory view of the sheet width at the time in a case where the sheet bundle 106 having a shorter sheet width than that of FIG. 11 is placed. In accordance with the sheet width of the sheet bundle 106, the interval between the two width regulating plates 121 is reduced as compared to the case of FIG. 11. In this case, the resistance value of the variable resistor 1101 changes. With this change in resistance value, for example, the voltage value is reduced.

Figure 13:
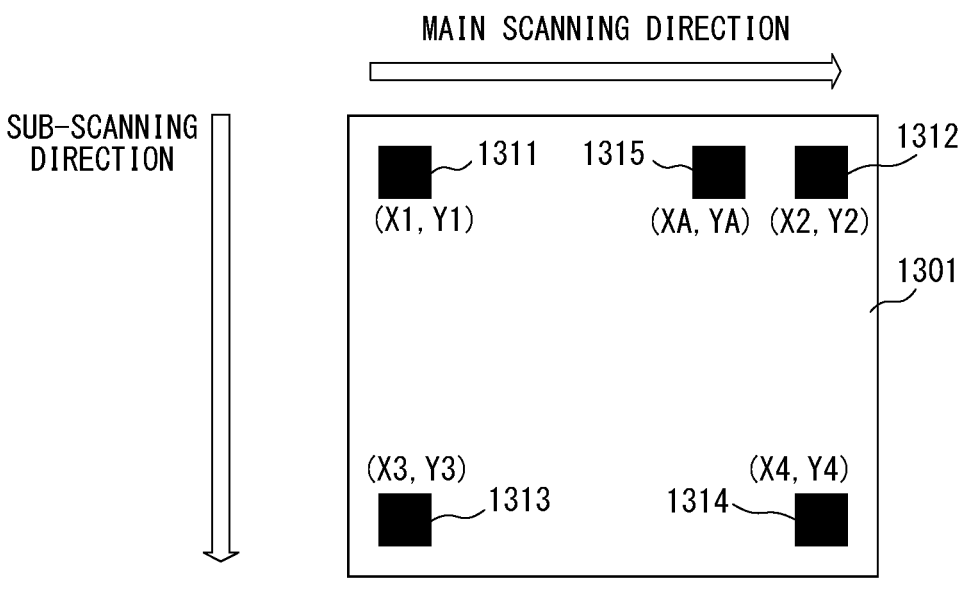
FIG. 13 is an exemplary view of a test chart.
Figure 14:
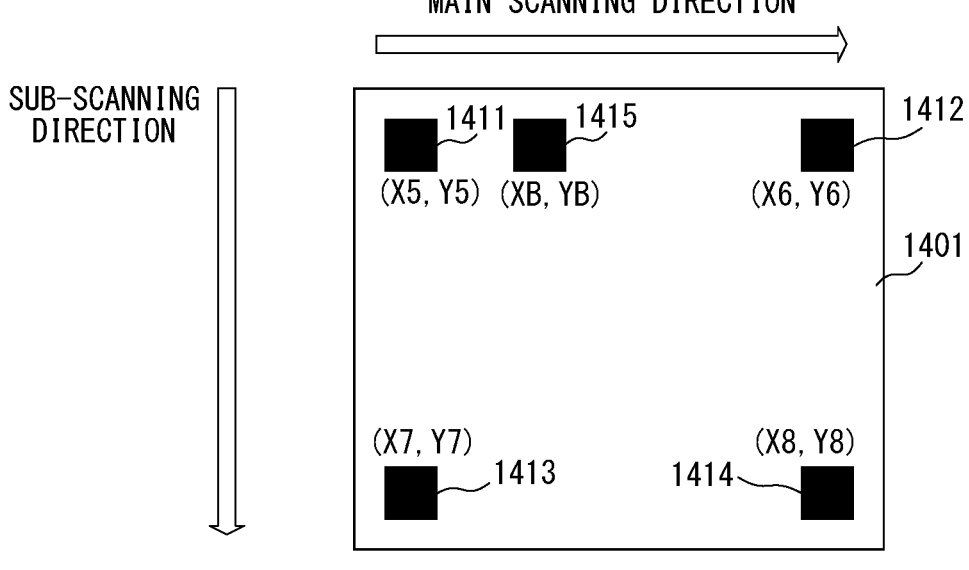
FIG. 14 is an exemplary view of the test chart.

FIG. 13 and FIG. 14 are exemplary views of the test chart in the second embodiment. FIG. 13 exemplifies an adjusting image 1301 printed on the front surface of the test chart (sheet). FIG. 14 exemplifies an adjusting image 1401 printed on the back surface of the test chart (sheet). The size of the test chart (sheet) in the second embodiment is the A4 size (297 mm (width)×210 mm (height)) as an example.

The adjusting image 1301 and the adjusting image 1401 include four patch images 1311 to 1314 and four patch images 1411 to 1414, respectively, for detecting the geometric characteristic of the image, at four corners in the vicinity of vertices of the sheet. Further, the adjusting image 1301 and the adjusting image 1401 include, in addition to the patch images 1311 to 1314 and 1411 to 1414 arranged at the four corners of the test chart, an identification image 1315 and an identification image 1415, respectively, for discriminating between the front surface and the back surface of the test chart. The identification image 1315 on the front surface and the identification image 1415 on the back surface are printed so as to be located at different positions within the read image. The image reading apparatus 101 can detect the positions of the identification images 1315 and 1415 from the reading result (read image) of the test chart so as to identify whether the read surface is the front surface or the back surface of the test chart, based on the positions of the identification images 1315 and 1415.

Description is given of a case in which the variation in sub-scanning magnification depending on the type of the sheet is calculated based on the read image read by the ADF reading mode.

Figure 15A:
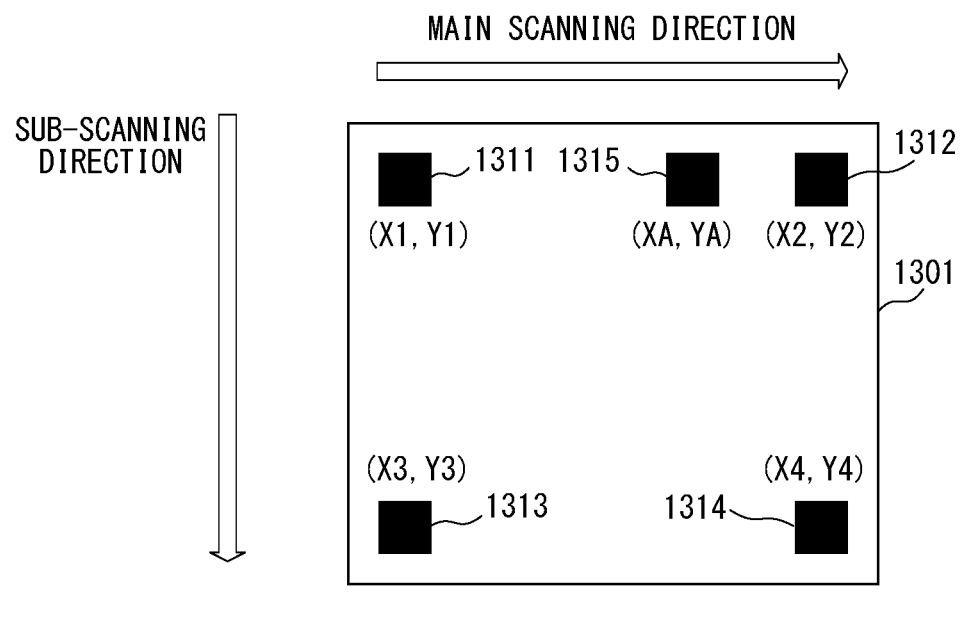
FIG. 15A and FIG. 15B are exemplary views of a direction of the test chart.
Figure 15B:
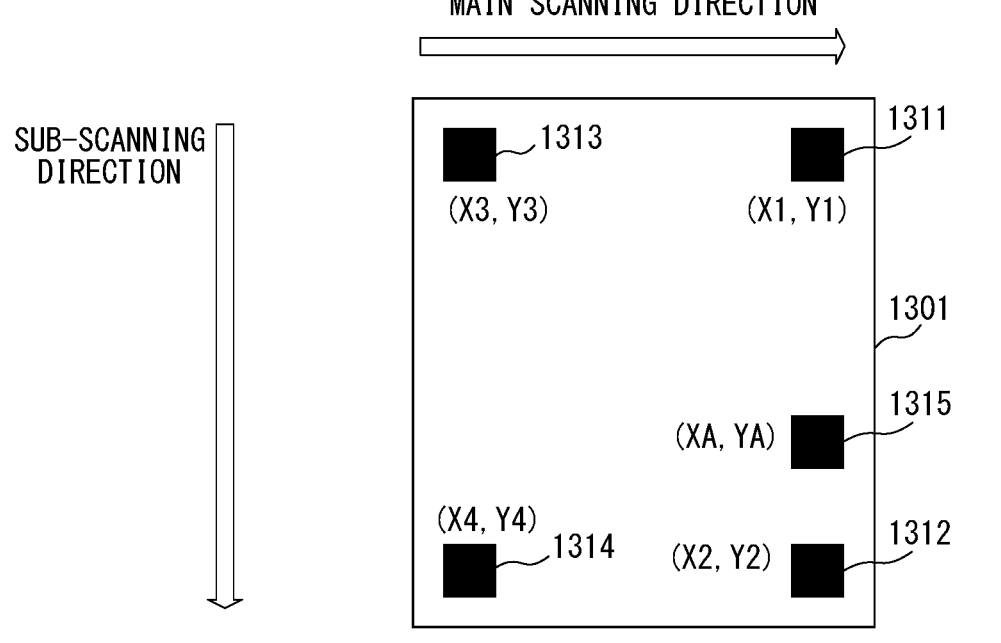

The orientation of the test chart being the A4-sized sheet is selected at the time of reading. That is, whether the long side of the test chart is set to the main scanning direction or the short side thereof is set to the main scanning direction is selected. FIG. 15A and FIG. 15B exemplify the direction of the test chart at the time of being placed on the original tray 105. FIG. 15A exemplifies a case in which the long side is the main scanning direction. FIG. 15B exemplifies a case in which the short side is the main scanning direction.

In a case where the orientation of the test chart to be read is different between the platen reading mode and the ADF reading mode, the detection of the sub-scanning magnification cannot be accurately performed. For example, in a case where the test chart is placed on the platen 103 in the orientation of FIG. 15A at the time of the platen reading mode, and the test chart is placed on the original tray 105 in the orientation of FIG. 15B at the time of the ADF reading mode, the orientations of an adjusting image 1301 are shifted by 90 degrees from each other. Under such a state, the same patch image is detected at completely different positions due to the difference in reading mode, and hence the sub-scanning magnification cannot be accurately detected. Further, even in a case where the misregistration of the printing positions on the front and back surfaces of the sheet is to be corrected, it is desired that the orientation of the test chart conveyed by the ADF 102 be matched.

In order to match the orientation of the test chart, in the second embodiment, in a case where the orientation of the test chart placed on the original tray 105 is different from that at the time of the platen reading mode, the display of the operation unit 901 notifies the user that the orientation of the test chart fails to match. For example, as illustrated in FIG. 15B, in a case where the test chart is placed on the original tray 105 so that its short side is oriented in the main scanning direction, the display of the operation unit 901 displays a message of urging the user to rotate the orientation of the test chart by 90 degrees.

Figure 16:
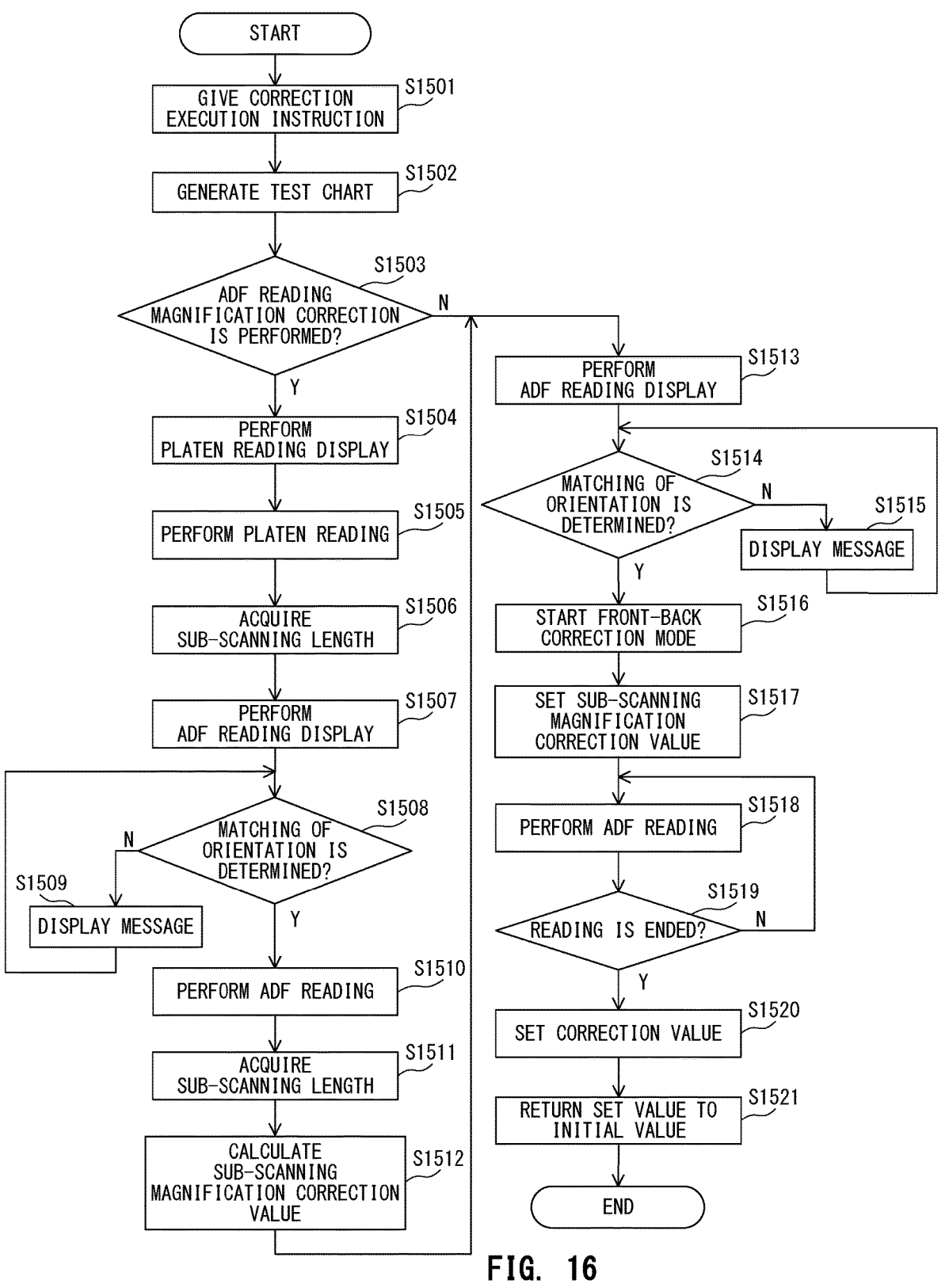
FIG. 16 is a flow chart for illustrating processing of correcting misregistration of printing positions on front and back surfaces.

The correction of the sub-scanning magnification and the correction of the printing positions on the front and back surfaces are performed by processing similar to that of the first embodiment after the orientation of the test chart is matched. FIG. 16 is a flow chart for illustrating the processing of correcting the misregistration of the printing positions on the front and back surfaces.

The process steps of from Step S1501 to Step S1507 are the same as the process steps of from Step S1001 to Step S1007 of FIG. 10, and hence description thereof is omitted. With the process step of Step S1507, the display of the operation unit 901 displays an instruction to place the test chart on the original tray 105 of the ADF 102 (ADF reading display).

The CPU 902 determines whether or not the orientation of the test chart placed on the original tray 105 matches the orientation of the test chart placed on the platen 103 at the time of the platen reading mode (Step S1508). The CPU 902 checks the sheet width of the test chart placed on the original tray 105 based on the voltage value representing the interval between the two width regulating plates 121. The CPU 902 determines the orientation of the test chart placed on the original tray 105 based on the sheet width. Further, the CPU 902 checks in advance the orientation of the test chart placed on the platen 103 at the time of the platen reading mode, based on the read image acquired by the platen reading mode in Step S1505. In this manner, the CPU 902 can determine whether or not the orientation of the test chart placed on the original tray 105 matches the orientation of the test chart at the time of the platen reading mode.

In a case where the orientation fails to match (Step S1508: N), the CPU 902 displays, on the display of the operation unit 901, a message of urging the user to rotate the orientation of the test chart in a clockwise direction by 90 degrees (Step S1509). With this display, the user can change the orientation of the test chart placed on the original tray 105 so as to match the orientation of the test chart at the time of the platen reading mode. In a case where the orientation is matched (Step S1508: Y), the CPU 902 performs process steps similar to the process steps of from Step S1008 to Step S1011 of FIG. 10 (Step S1510 to Step S1513).

After that the CPU 902 determines whether or not the orientation of the test chart placed on the original tray 105 matches the orientation of the test chart placed on the platen 103 at the time of the platen reading mode (Step S1514). This process step is similar to the process step of Step S1508.

In a case where the orientation fails to match (Step S1514: N), the CPU 902 displays, on the display of the operation unit 901, a message of urging the user to rotate the orientation of the test chart in the clockwise direction by 90 degrees (Step S1515). With this display, the user can change the orientation of the test chart placed on the original tray 105 so as to match the orientation of the test chart at the time of the platen reading mode. In a case where the orientation is matched (Step S1514: Y), the CPU 902 performs process steps similar to the process steps of from Step S1012 to Step S1017 of FIG. 10 (Step S1516 to Step S1521). As described above, the correction processing for correcting the misregistration of the printing positions on the front and back surfaces is ended.

In the process steps of Step S1509 and Step S1515, the message of urging the user to rotate the orientation of the test chart in the clockwise direction by 90 degrees is displayed so as to notify the user that the orientation of the test chart fails to match. A message of urging the user to place the test chart so as to be rotated by 270 degrees may be displayed depending on the orientation of the test chart at the time of the platen reading mode.

In the above-mentioned example, the determination on the orientation of the test chart is made at the timing at which the test chart is placed on the original tray 105, and the user is urged to change the orientation of the test chart depending on the determination result. The determination on the orientation of the test chart and the notification of urging the user to change the orientation of the test chart may be performed at the timing at which, for example, the job of the ADF reading mode is actually executed. Further, those operations may be performed at the timing at which the reading by the ADF reading mode is ended.

As described above, before the misregistration of the printing positions on the front and back surfaces of the sheet is measured, the sub-scanning magnification is corrected depending on the sheet to be actually used. In this case, through use of the actual length of the sheet in the conveying direction and the length of the sheet in the conveying direction read through use of the ADF 102, the sub-scanning magnification can be accurately corrected while the variation in sub-scanning magnification is suppressed, regardless of the type of the sheet. Accordingly, the misregistration of the printing positions on the front and back surfaces of the sheet can be corrected with high accuracy. Further, the orientation of the test chart is matched between the platen reading mode and the ADF reading mode, and hence the correction of the sub-scanning magnification and the correction of the misregistration of the printing positions on the front and back surfaces of the sheet can be performed with high accuracy.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-045374, filed Mar. 22, 2023, which is hereby incorporated by reference herein in its entirety.

What is claimed is:

1. An image reading apparatus comprising:
a tray on which a sheet is to be placed;
a conveyance unit configured to convey the sheet placed on the tray;
a platen on which a sheet is to be placed;
a reading unit configured to read one of a first surface of the sheet conveyed by the conveyance unit and a first surface of the sheet placed on the platen; and
a controller configured to control the image reading apparatus to execute:
a first reading mode of reading, by the reading unit, a first surface of a sheet having a plurality of test images formed thereon, which is conveyed by the conveyance unit; and
a second reading mode of reading, by the reading unit, the first surface of the sheet having the plurality of test images formed thereon, which is placed on the platen,
wherein the controller is configured to obtain a correction value for correcting a reading operation of reading, by the reading unit, the sheet conveyed by the conveyance unit, based on a first read image read by the first reading mode and a second read image read by the second reading mode.

2. The image reading apparatus according to claim 1, wherein the controller is configured to obtain the correction value based on a first length of the first read image in a conveying direction of the sheet and a second length of the second read image in the conveying direction.

3. The image reading apparatus according to claim 2, wherein the correction value is a value obtained by dividing the first length by the second length.

4. The image reading apparatus according to claim 1,
wherein the tray has two regulating plates provided thereon, the two regulating plates being provided in a second direction orthogonal to a conveying direction of the sheet and being configured to regulate the second direction of the sheet placed on the tray, and
wherein the reading unit is configured to:
determine an orientation of the sheet placed on the tray based on an interval between the two regulating plates and a length of the sheet in the second direction obtained from the second read image; and
notify a user to match the orientation of the sheet in a case where the orientation of the sheet fails to match between the first reading mode and the second reading mode.

5. The image reading apparatus according to claim 1,
wherein the sheet has two test images printed thereon at positions different from each other in a conveying direction of the sheet, and
wherein the controller is configured to generate the correction value based on a distance between the two test images obtained from the first read image and a distance between the two test images obtained from the second read image.

6. The image reading apparatus according to claim 5, wherein the controller is configured to generate the correction value so that the distance between the two test images obtained from the first read image is matched with the distance between the two test images obtained from the second read image.

7. The image reading apparatus according to claim 1, further comprising a second reading unit configured to read the sheet conveyed by the conveyance unit,
wherein the controller is configured to generate the correction value based on, in place of the first read image, a third read image obtained by the second reading unit and on the second read image.

8. The image reading apparatus according to claim 7,
wherein the sheet has four test images printed thereon at four corners of each of the first surface and a second surface different from the first surface,
wherein the second reading unit is configured to read the second surface of the sheet, and
wherein the controller is configured to generate a second correction value for correcting a geometric characteristic of an image to be printed onto the sheet, based on read images of the first surface and the second surface obtained by reading, by the reading unit and the second reading unit, the sheet conveyed by the conveyance unit after correction based on the correction value has been performed.

9. The image reading apparatus according to claim 8, wherein the controller is configured to generate the second correction value for correcting misregistration of printing positions of images on the first surface and the second surface of the sheet.

10. The image reading apparatus according to claim 8, wherein the sheet has printed thereon, in addition to the four test images, an identification image for discriminating between the first surface and the second surface, the identification image being printed on each of the first surface and the second surface.

11. The image reading apparatus according to claim 1,
wherein the sheet has four patch images printed thereon at four corners thereof, and
wherein the controller is configured to generate, after correction based on the correction value has been performed, a third correction value for correcting a geometric characteristic of an image to be printed onto the sheet, based on the first read image.

12. An image reading apparatus comprising:
a tray on which a sheet is to be placed;
a conveyance unit configured to convey the sheet placed on the tray;
a platen on which a sheet is to be placed;
a reading unit configured to read one of a first surface of the sheet conveyed by the conveyance unit and a first surface of the sheet placed on the platen; and
a controller configured to control the image reading apparatus to execute:

a first reading mode of reading, by the reading unit, a first surface of a sheet having a plurality of test images formed thereon, which is conveyed by the conveyance unit; and a second reading mode of reading, by the reading unit, the first surface of the sheet having the plurality of test images formed thereon, which is placed on the platen, wherein the controller is configured to correct a conveying speed of the sheet conveyed by the conveyance unit, based on a first read image read by the first reading mode and a second read image read by the second reading mode, and control the reading unit to execute reading of a sheet conveyed at the corrected conveying speed.

13. The image reading apparatus according to claim 12, wherein the conveying speed after correction is a value obtained by multiplying the conveying speed before the correction by a correction value obtained based on the first read image and the second read image.

14. An image forming apparatus comprising:

a printer engine configured to form an image onto a sheet based on a predetermined image forming condition;

a tray on which the sheet having the image formed thereon by the printer engine is to be placed;

a conveyance unit configured to convey the sheet placed on the tray;

a platen on which the sheet having the image formed thereon by the printer engine is to be placed;

a reading unit configured to read one of a first surface of the sheet conveyed by the conveyance unit and a first surface of the sheet placed on the platen; and a controller configured to control the image forming apparatus to execute:

a first reading mode of reading, by the reading unit, a first surface of a sheet having a plurality of test images formed thereon, which is conveyed by the conveyance unit; and a second reading mode of reading, by the reading unit, the first surface of the sheet having the plurality of test images formed thereon, which is placed on the platen, wherein the controller is configured to obtain a first correction value for correcting a reading operation of reading, by the reading unit, the sheet conveyed by the conveyance unit, based on a first read image read by the first reading mode and a second read image read by the second reading mode, and wherein the controller is configured to generate a second correction value for correcting the image forming condition, based on a read image obtained by reading, by the reading unit, the sheet conveyed by the conveyance unit after correction based on the first correction value has been performed.

15. The image forming apparatus according to claim 14, further comprising a second reading unit configured to read an image on a second surface different from the first surface of the sheet, wherein the controller is configured to generate the second correction value for correcting a geometric characteristic of an image to be printed onto the sheet by the printer engine, based on read images of the first surface and the second surface obtained by reading, by the reading unit and the second reading unit, the sheet conveyed by the conveyance unit after the correction based on the first correction value has been performed.

* * * * *